United States Patent
Scherzer

(10) Patent No.: US 6,347,234 B1
(45) Date of Patent: *Feb. 12, 2002

(54) PRACTICAL SPACE-TIME RADIO METHOD FOR CDMA COMMUNICATION CAPACITY ENHANCEMENT

(75) Inventor: Shimon B. Scherzer, Sunnyvale, CA (US)

(73) Assignees: Adaptive Telecom, Inc., Campbell, CA (US); Metawave Communications Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,482

(22) Filed: Jan. 13, 1999

Related U.S. Application Data

(63) Continuation-in-part of application No. 08/929,638, filed on Sep. 15, 1997.
(60) Provisional application No. 60/071,473, filed on Jan. 13, 1998, provisional application No. 60/077,979, filed on Mar. 13, 1998, and provisional application No. 60/093,150, filed on Jul. 17, 1998.

(51) Int. Cl.[7] .................................................. H04Q 7/20
(52) U.S. Cl. ...................................... 455/562; 455/550
(58) Field of Search .............................. 455/562, 550, 455/501, 506, 509, 561, 63, 42, 13.3, 62; 376/479, 441, 342, 329, 310, 280; 375/200, 208, 210, 209, 267, 347

(56) References Cited

U.S. PATENT DOCUMENTS

| | | | | |
|---|---|---|---|---|
| 5,434,578 A | * | 7/1995 | Stehlik ......................... | 342/383 |
| 5,471,647 A | * | 11/1995 | Gerlach et al. ............... | 455/63 |
| 5,546,090 A | * | 8/1996 | Roy, III et al. .............. | 342/174 |
| 5,563,610 A | * | 10/1996 | Reudink ................... | 455/277.1 |
| 5,592,490 A | * | 1/1997 | Barratt et al. ................ | 370/310 |
| 5,604,732 A | * | 2/1997 | Kim et al. ................... | 370/242 |
| 5,828,658 A | * | 10/1998 | Ottersten et al. ........... | 370/310 |
| 5,848,060 A | * | 12/1998 | Dent .......................... | 370/281 |
| 5,886,988 A | * | 3/1999 | Yun et al. ................... | 370/329 |
| 5,937,014 A | * | 8/1999 | Pelin et al. ................. | 375/340 |
| 5,973,638 A | * | 10/1999 | Robbins et al. ............. | 342/172 |
| 6,101,399 A | * | 8/2000 | Raleigh et al. ............. | 375/561 |
| 6,122,260 A | * | 9/2000 | Liu et al. .................... | 370/318 |

* cited by examiner

Primary Examiner—Dwayne Bost
Assistant Examiner—Jean A Gelin

(57) ABSTRACT

A practical way to enhance signal quality (carrier to interference. C/I) in both up and downlink of wireless point to multi-point CDMA service implements basic radio direction finding techniques to allow for optimal diversity combining in an antenna array employing large number of elements. This approach is facilitated through the use of very small bit counts arithmetic and capitalizing on finite alphabet signal structure (Walsh symbols, for example in IS-95 CDMA) or a known training sequence. Alternate implementations can use floating point data representations. The method facilitates ASIC implementation, thereby enabling distributed processing to achieve the required computation practicality. The method utilizes the uplink channel data to determine the downlink spatial structure (array beams) to enhance downlink C/I and hence, increase downlink capacity. The preferred embodiment is optimized to IS-95, however, any signal that has either a finite alphabet or a training sequence built in can utilize the same idea. The use of the known signal structure facilitates simple array response vector determination and eliminates the necessity for covariance matrix calculation and analysis. Hence, this approach can be utilized for GSM and TDMA wireless air-interfaces as well.

51 Claims, 13 Drawing Sheets

PRACTICAL SPACE-TIME RADIO METHOD FOR CDMA COMMUNICATION CAPACITY ENHANCEMENT

This application is a continuation-in-part of US patent application Ser. No. 08/929,638 filed Sep. 15, 1997, and claims priority from U.S. provisional patent applications Ser. Nos. 60/071,473 filed Jan. 13, 1998, 60/077,979 filed Mar. 13, 1998 and 60/093,150 filed Jul. 17, 1998. This application is also related to U.S. Disclosure Document Number 405,643 filed Sep. 23, 1996, which is incorporated herein by reference.

FIELD OF INVENTION

The present invention relates to wireless communication systems. More specifically, the invention relates to methods for enhancement of wireless communication performance by exploiting the spatial domain, and practical systems for implementing such methods.

BACKGROUND

Due to the increasing demand for wireless communication, it has become necessary to develop techniques for more efficiently using the allocated frequency bands, i.e., increasing the capacity to communicate information within a limited available bandwidth. In conventional low capacity wireless communication systems, information is transmitted from a base station to subscribers by broadcasting omnidirectional signals on one of several predetermined frequency channels. Similarly, the subscribers transmit information back to the base station by broadcasting similar signals on one of the frequency channels. In this system, multiple users independently access the system through the division of the frequency band into distinct subband frequency channels. This technique is known as frequency division multiple access (FDMA).

A standard technique used by commercial wireless phone systems to increase capacity is to divide the service region into spatial cells. Instead of using just one base station to serve all users in the region, a collection of base stations are used to independently service separate spatial cells. In such a cellular system, multiple users can reuse the same frequency channel without interfering with each other, provided they access the system from different spatial cells. The cellular concept, therefore, is a simple type of spatial division multiple access (SDMA).

In the case of digital communication, additional techniques can be used to increase capacity. A few well known examples are time division multiple access (TDMA) and code division multiple access (CDMA). TDMA allows several users to share a single frequency channel by assigning their data to distinct time slots. CDMA is normally a spread-spectrum technique that does not limit individual signals to narrow frequency channels but spreads them throughout the frequency spectrum of the entire band. Signals sharing the band are distinguished by assigning them different orthogonal digital code sequences. CDMA has been considered the most promising method among the various air-interfaces in the industry, as shown by theoretical analysis and recent increase in use.

Despite the promise of CDMA, practical issues such as power control speed and inter-base station interference considerably limited system effectiveness in its initial phase of implementation. CDMA based system capacity depends very much on the ability to provide for very accurate power control; but in a mobile environment, the signal may fluctuate too fast for the system to manage effective control. In addition, mobile wireless environments are often characterized by unstable signal propagation, severe signal attenuation between the communicating entities and co-channel interference by other radio sources. Moreover, many urban environments contain a significant number of reflectors (such as buildings), causing a signal to follow multiple paths from the transmitter to the receiver. Because the separate parts of such a multipath signal can arrive with different phases that destructively interfere, multipath can result in unpredictable signal fading. In addition, in order to provide service to shadowed areas, radiated power is increased, thereby increasing interference between base stations and significantly degrading system performance.

Recently, considerable attention has focused on ways to increase wireless system performance by further exploiting the spatial domain. It is well recognized that SDMA techniques could, in principle, significantly improve the CDMA based network performance. In practice, however, such significant improvements have yet to be realized. Currently proposed approaches are either simple but not very effective or effective but too complex for practical implementation.

One well-known SDMA technique is to provide the base station with a set of independently controlled directional antennas, thereby dividing the cell into separate fixed sectors, each controlled by a separate antenna. As a result, the frequency reuse in the system can be increased and/or cochannel interference can be reduced. A similar but more complex technique can be implemented with a coherently controlled antenna array instead of independently controlled directional antennas. Using a signal processor to control the relative phases of the signals applied to the antenna array elements, predetermined beams can be formed in the directions of the separate sectors. Similar signal processing can be used to selectively receive signals only from within the distinct sectors. These simple sectoring techniques, however, only provide a relatively small increase in capacity.

U.S. Pat. No. 5,563,610 discloses a method for mitigating signal fading due to multipath in a CDMA system. By introducing intentional delays into received signals, non-correlated fading signal components can be better differentiated by the RAKE receiver. Although this diversity method can reduce the effects of fading, it does not take advantage of the spatial domain and does not directly increase system capacity. Moreover, this approach, which combines angular and time diversity using a fixed beam configuration, is not effective since either the beam outputs are significantly different in level or they are similar in level but highly correlated. If two signal parts are arriving from a similar direction, they are passing through one beam and thus are not spatially distinguishable. If the signal parts are arriving between beams, on the other hand, the levels are similar but then they are highly correlated.

More sophisticated SDMA techniques have been proposed that theoretically could dramatically increase system capacity. For example, U.S. Pat. Nos. 5,471,647 and 5,634,199, both to Gerlach et al., and U.S. Pat. No. 5,592,490 to Barratt et al. disclose wireless communication systems that increase performance by exploiting the spatial domain. In the downlink, the base station determines the spatial channel of each subscriber and uses this channel information to adaptively control its antenna array to form customized narrow beams. These beams transmit an information signal over multiple paths so that the signal arrives to the subscriber with maximum strength. The beams can also be selected to direct nulls to other subscribers so that cochannel interference is reduced. In the uplink, the base station uses the channel information to spatially filter the received signals so that the uplink signal is received with maximum sensitivity and distinguished from the signals transmitted by other subscribers. Through selective power delivery by intelligent directional beams, the interference between base stations and the carrier-to-interference ratio at the base station receivers can be reduced.

The biggest issue in adaptive beamforming is how to quickly estimate the wireless air channel to allow for effective beam allocation. In the uplink, there are known signal processing techniques for estimating the spatial channel from the signals received at the base station antenna array. These techniques conventionally involve an inversion or singular value decomposition of a signal covariance matrix. The computational complexity of this calculation, however, is so high that it is presently not practical to implement. These highly complex approaches capitalize on the theory of array signal processing. These approaches estimate the uplink channel (e.g. the angles and times of arrival of the multipath signal parts) to create a space-time matched filter to allow for maximum signal delivery. The method involves computation of a signal covariance matrix and derivation of its eigenvectors to determine the array coefficients. The basic equation of array signal processing is:

$$X=AS+N,$$

where X is a matrix of antenna array signal snapshots (each column incorporates snapshots of all antenna elements), S is the transmitted signal matrix (each column incorporates snapshots of the information signal, A is the antenna array and channel response matrix, and N is the noise matrix. The main challenge of array signal processing is to estimate S based on the statistics of A and S, that is, to reliably and correctly estimate all the incoming signals despite the presence of interference and thermal noise, N. This problem has been a subject for extensive research for several years. Two well known estimating algorithms involve Maximum Likelihood Sequence Estimation (MLSE) and Minimum Mean Square Error (MMSE). Using these techniques, if S represents signals with-known properties such as constant modules (CM), or finite alphabet (FA), the process can be executed using the known signal's temporal structure statistics. If the array manifold is known, then convergence can be made faster. This process, however, is very computational intensive. In a typical base station that must simultaneously support more than 100 mobile units, the computational power is presently beyond practical realization.

Most adaptive beam forming methods described in the art (e.g. U.S. Pat. No. 5,434,578) deal extensively with uplink estimation, while requiring extensive computational resources. Few, however, deal with downlink estimation, which is a more difficult problem. Because the spatial channel is frequency dependent and the uplink and downlink frequencies are often different, the uplink beamforming techniques do not provide the base station with sufficient information to derive the downlink spatial channel information and improve system capacity. One technique for obtaining downlink channel information is to use feedback from the subscriber. The required feedback rates, however, make this approach impractical to implement.

There is a need, therefore, for significantly increasing wireless system capacity using beamforming methods that overcome the limitations in the known approaches.

SUMMARY OF THE INVENTION

The present invention provides a method for wireless communication that exploits the spatial domain in both uplink and downlink without requiring computationally complex processing. Surprisingly, the method provides for significant capacity enhancement in both uplink and downlink while maintaining implementation simplicity. This goal is achieved by eliminating the necessity for covariance matrix processing, using low bit count arithmetic and by capitalizing on signal multipath structures.

A method for wireless communication according to the present invention comprises transmitting from a mobile unit a code modulated signal, such as a CDMA signal, which is obtained by modulating original symbols by a predetermined pseudo-noise sequence. The original symbols represent an original information signal. A base station antenna array then receives in parallel N complex valued signal sequences from N corresponding antenna elements. Each of the N signal sequences are then correlated with the pseudo-noise sequence to despread and select N received signals comprising N received symbols corresponding to a common one of the original symbols. The N received symbols are then transformed in parallel to obtain N complex-valued transformer outputs which are then correlated collectively with a set of complex array calibration vectors to obtain spatial information about the signal. Each array calibration vector represents a response of the antenna array to a calibration signal originating in a predetermined direction relative to the base station. The above steps are repeated to obtain spatial information about multiple signal components corresponding to the same mobile. This spatial information is then used to spatially filter subsequent complex valued signal sequences. The filtered signal is then demodulated to obtain a symbol from the original information signal.

The original symbols are selected from a finite symbol alphabet. In a preferred embodiment, the finite alphabet contains not more than 64 symbols and the calibration vectors comprise complex valued components having 1-bit plus sign real part and 1-bit plus sign imaginary part. This simple representation permits the correlation to be computed using only addition, i.e., without the need for computationally complex multiplications. In one embodiment, the correlating step yields spatial information about multiple signal components from the mobile having small time separated signal parts (i.e., having a time spread less than one chip). Another embodiment of the invention includes the step of tracking time and angle information of the multiple signal components.

The invention further provides for spatially filtering a downlink information signal in accordance with the spatial information about the multiple signal components that were determined from the uplink. The spatial filtering comprises assigning the mobile unit to a beam based on spatial information about the mobile. This spatial information comprises directional and distance information about the mobile. The downlink beams are a dynamically adaptive set of overlapping broad and narrow beams such that closer mobiles are assigned to broader beams and more distant mobiles are assigned to narrower beams. The set of beams are modified depending on the statistics of the spatial information of all mobiles served by the base station in order to optimize system performance. In the preferred embodiment, the transmitting of the downlink beams is performed in accordance with beamforming information comprising complex valued elements having 3-bit-plus-sign real part and 3-bit-plus-sign imaginary part.

The invention also provides a CDMA base station implementing the above method. The station comprises an antenna array having N antenna elements, and a set of N receivers coupled to the N antenna elements to produce N incoming signals. The base station also comprises a set of N despreaders coupled to the N receivers for producing from the N incoming signals N despread signals corresponding to a single mobile unit. A set of N symbol transformers is coupled to the N despreaders and produces a complex-valued output from the despread signals. A spatial correlator coupled to the N symbol transformers correlates the complex-valued output with stored array calibration data to produce beamforming information for multiple signal parts associated with the mobile unit. In the preferred embodiment, the array calibration data is composed of complex valued array response elements represented as bit-plus-sign imaginary parts and bit-plus-sign real parts. A receiving beamformer coupled to the spatial correlator and to the N receivers then spatially filters the N incoming signals in accordance with the beamforming information. A RAKE receiver (or other equivalent receiver) coupled to the receiving beamformer produces from the spatially filtered signals an information signal. In one embodiment, the base station also includes a tracker coupled to the spatial correlator and to the receiving beamformer. The tracker tracks multiple signal parts and optimizes the performance of the receiving beamformer.

In the preferred embodiment, the base station also includes a transmitting beamformer coupled to the spatial correlator. The transmitting beamformer generates spatial beams in accordance with the beamforming information to increase system capacity. The spatial beams are a dynamically calculated set of downlink beams comprising narrow beams and overlapping broad beams such that the narrow beams are phase matched to the overlapping wide beams. The spatial beams are selected such that more distant mobiles are assigned to narrower beams and closer mobiles are assigned to broader beams.

BRIEF DESCRIPTION OF THE DRAWING FIGURES

FIG. 1 provides a general view of the system architecture of a base station according to the present invention.

FIG. 2 illustrates the details of the spatial correlator shown in FIG. 1.

FIG. 3 details the uplink beam former shown in FIG. 1.

Figure 9:
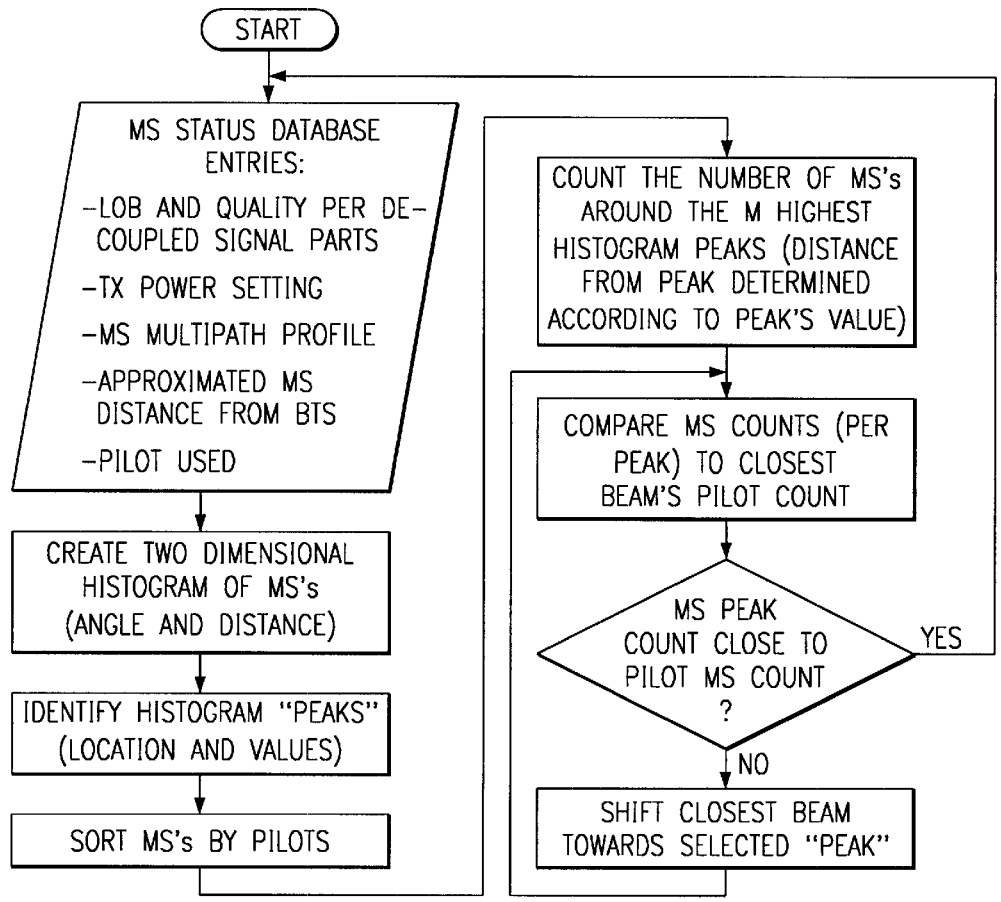

FIG. 9 presents a flowchart of the downlink beamforming determination process according to an embodiment of the invention.

Figure 10:
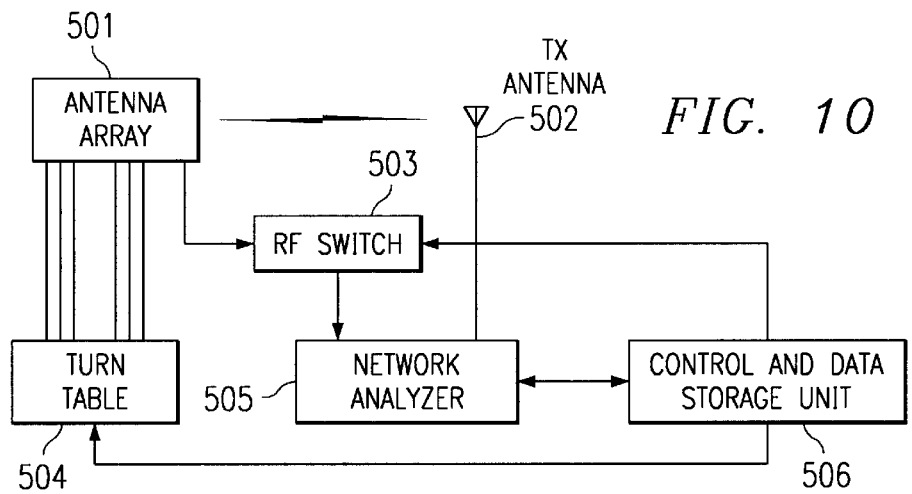

FIG. 10 presents an apparatus to generate an antenna array manifold (calibration table) according to a technique of the present invention.

Figure 11:
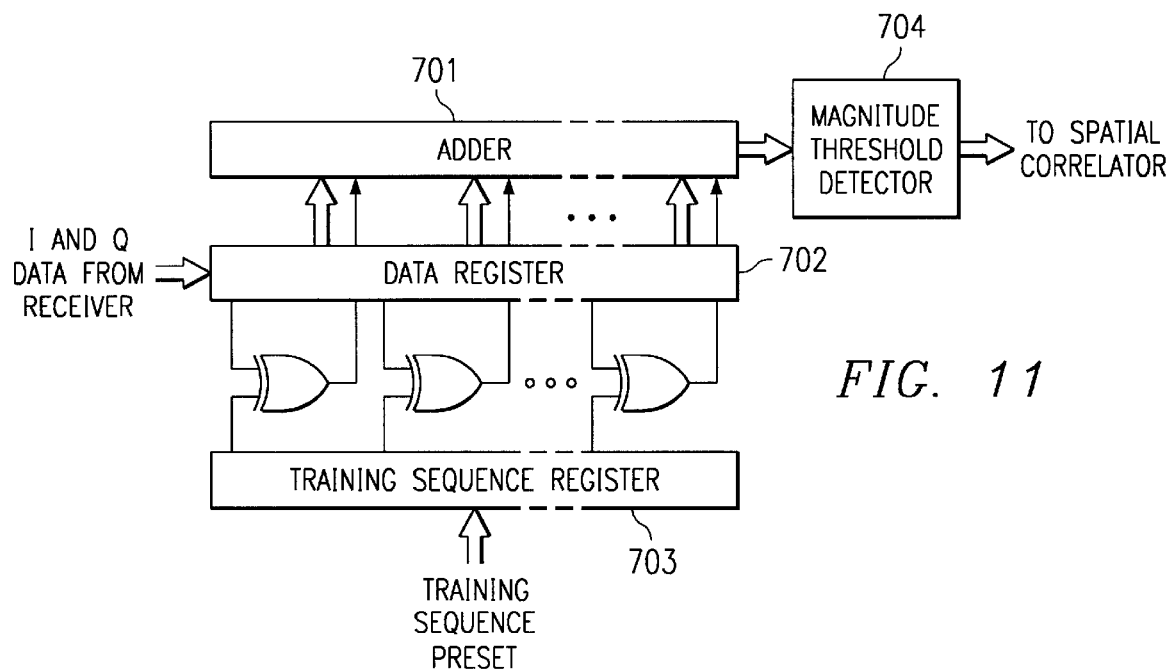

FIG. 11 illustrates a training sequence convolver according to an embodiment of the invention.

Figure 12:
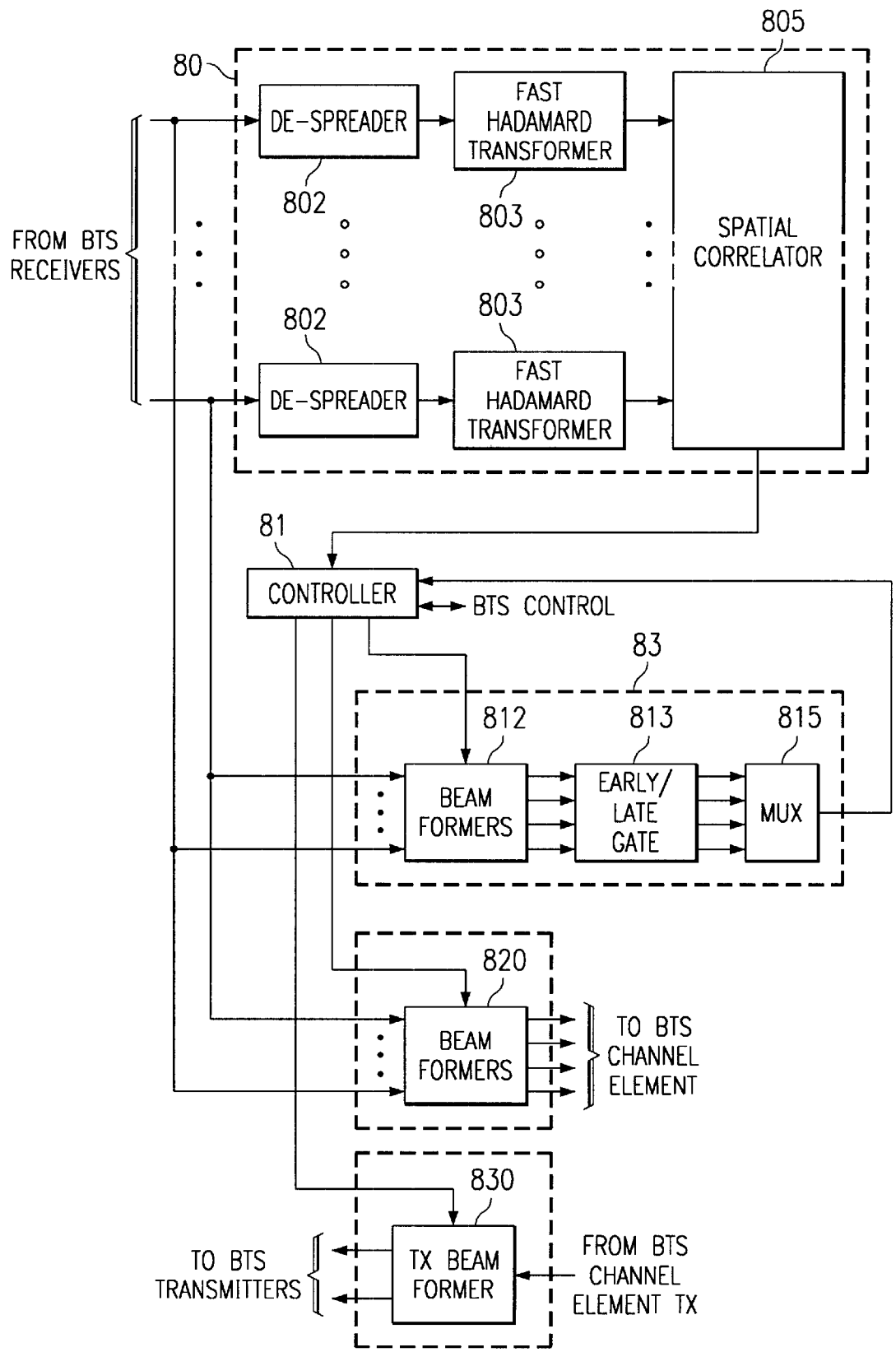

FIG. 12 presents an embodiment of the invention that includes both searching and tracking functions (in angle & time).

Figure 13:
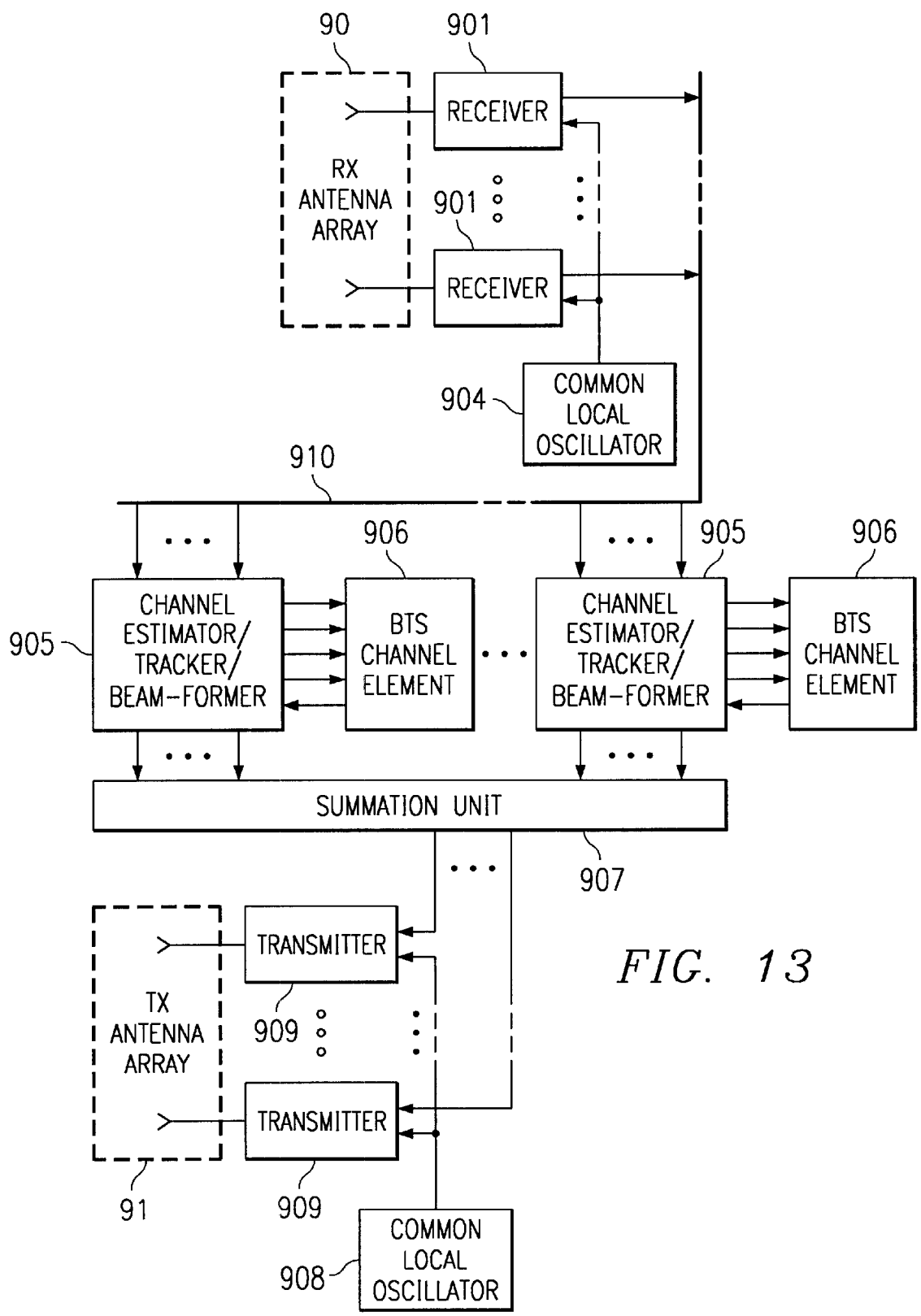

FIG. 13 presents an overview of a base station that employs channel estimators/trackers/beamformers described in FIG. 12.

Figure 14:
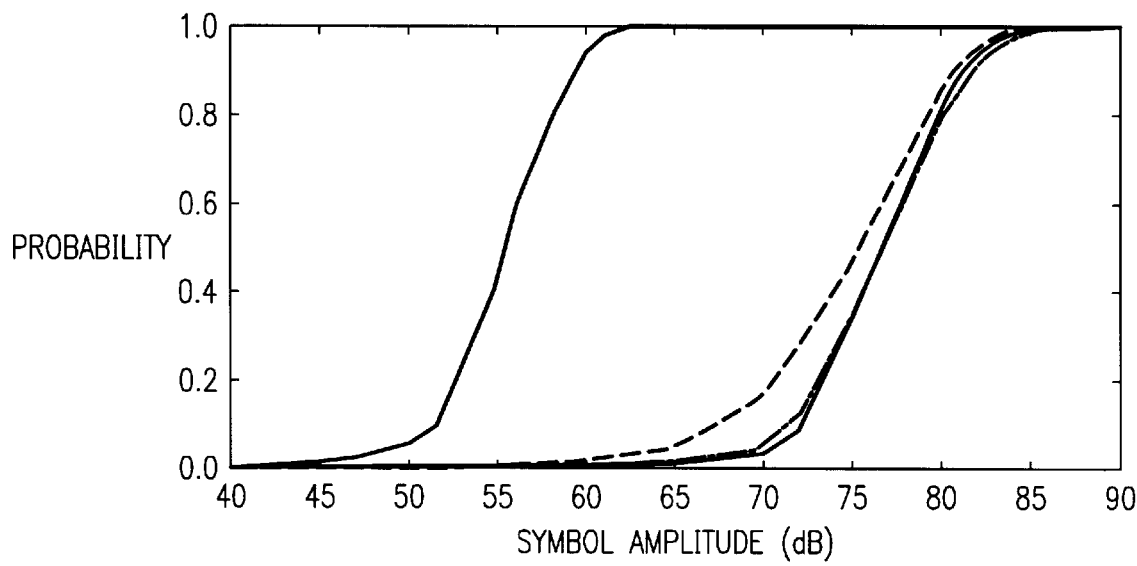

FIG. 14 is a graph illustrating CDF for symbol amplitude for three degree angular spread in the case where two to four beams are contiguously arranged with some overlap to cover the scattering zone.

Figure 15:
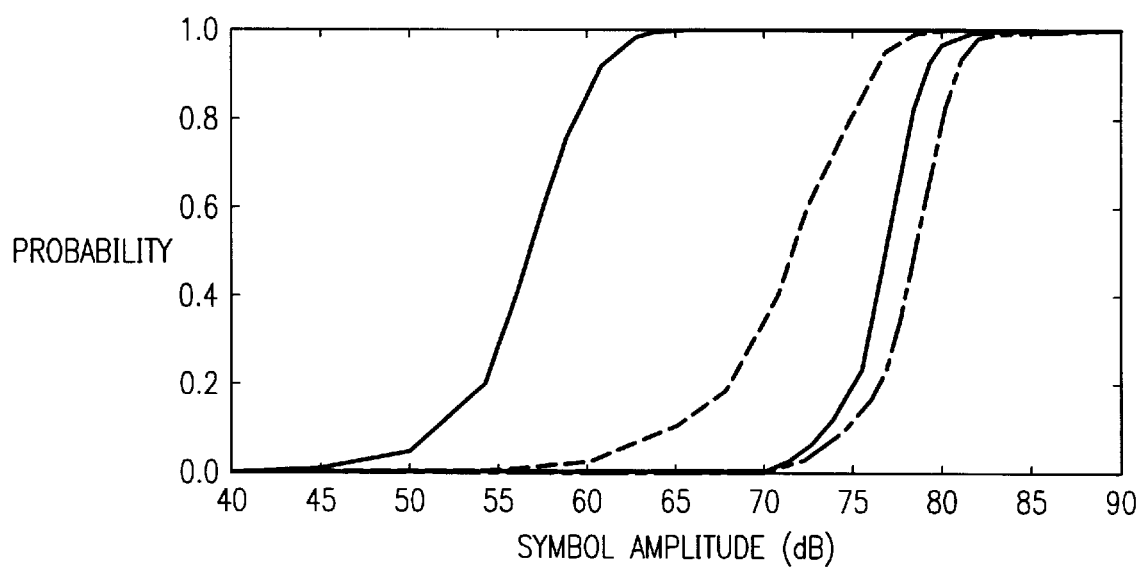

FIG. 15 is a graph illustrating CDF for symbol amplitude for ten degree angular spread.

Figure 16:
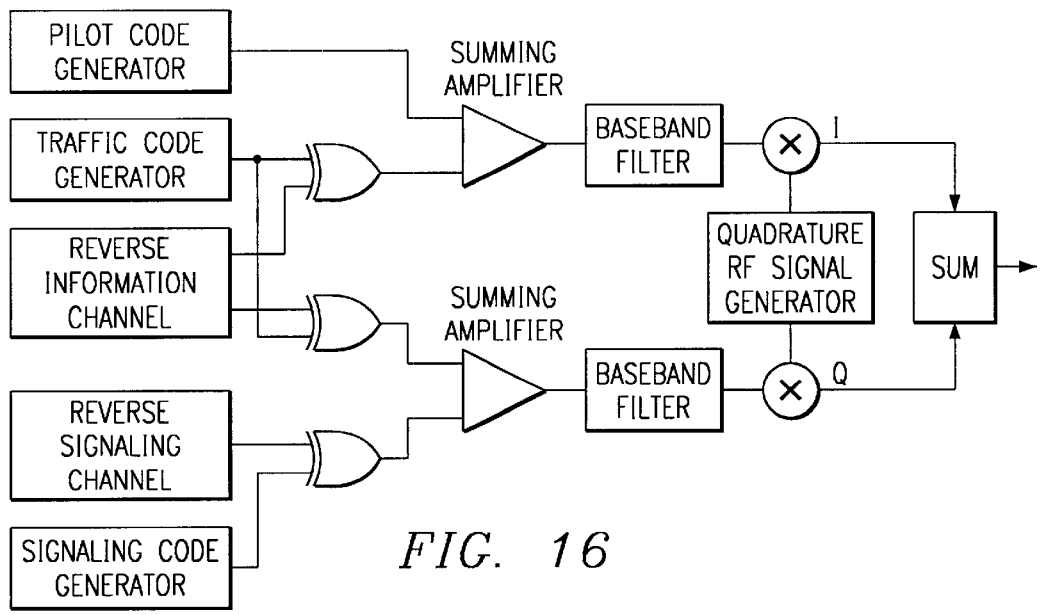

FIG. 16 presents a possible implementation of a W-CDMA uplink traffic channel transmitter.

Figure 17:
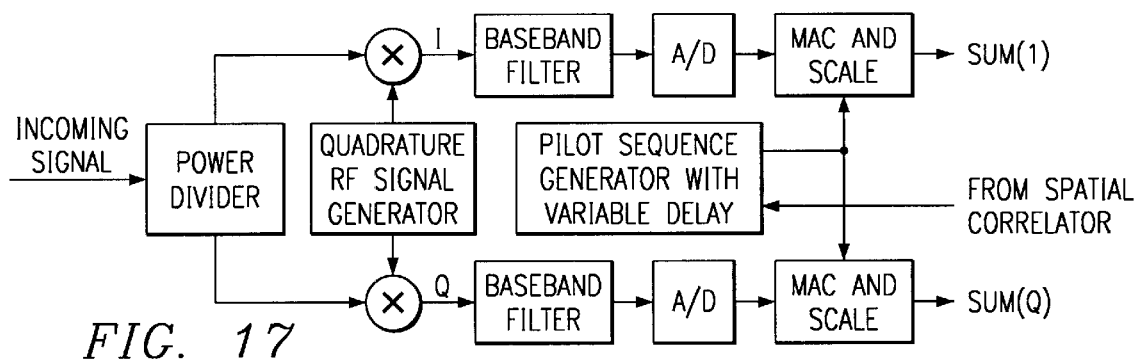

FIG. 17 shows a possible circuit to estimate the carrier relative electrical phase and to obtain a single element of an array response vector according to an embodiment of the present invention.

Figure 18:
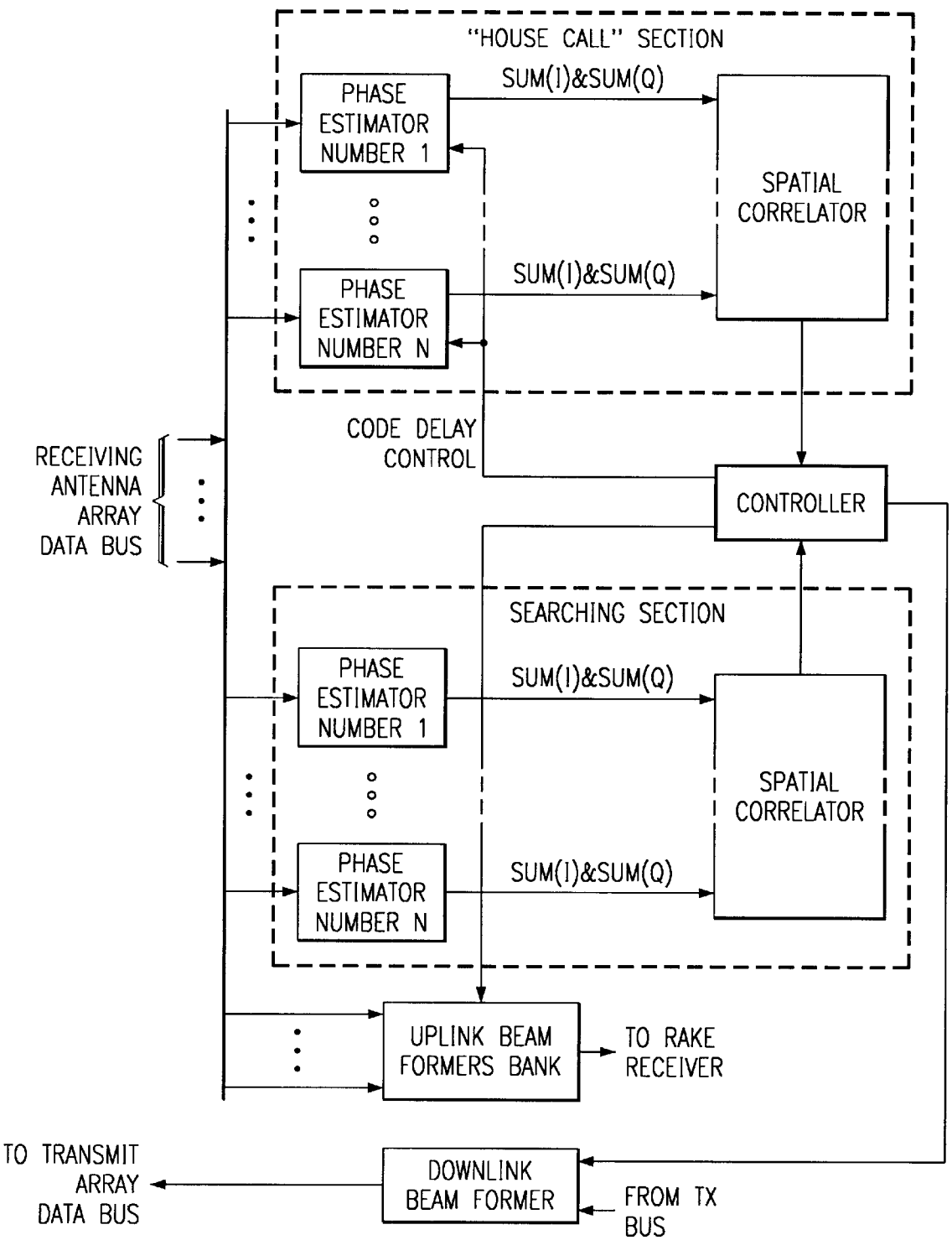

FIG. 18 presents a pilot assisted beam director enhancement to a search process utilizing a spatial correlator and analyzer, according to an embodiment of the present invention.

Figure 19:
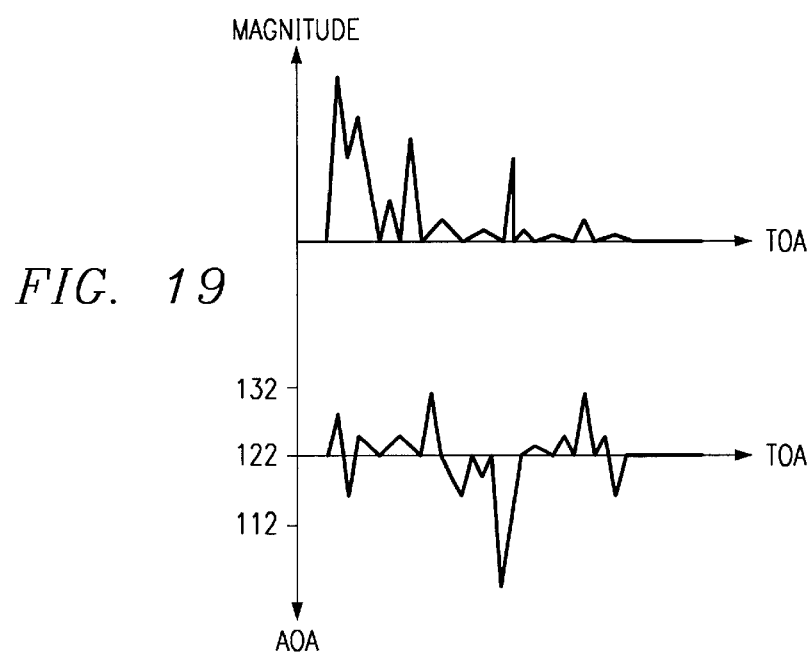

FIG. 19 is a graph of typical CIR data.

Figure 20:
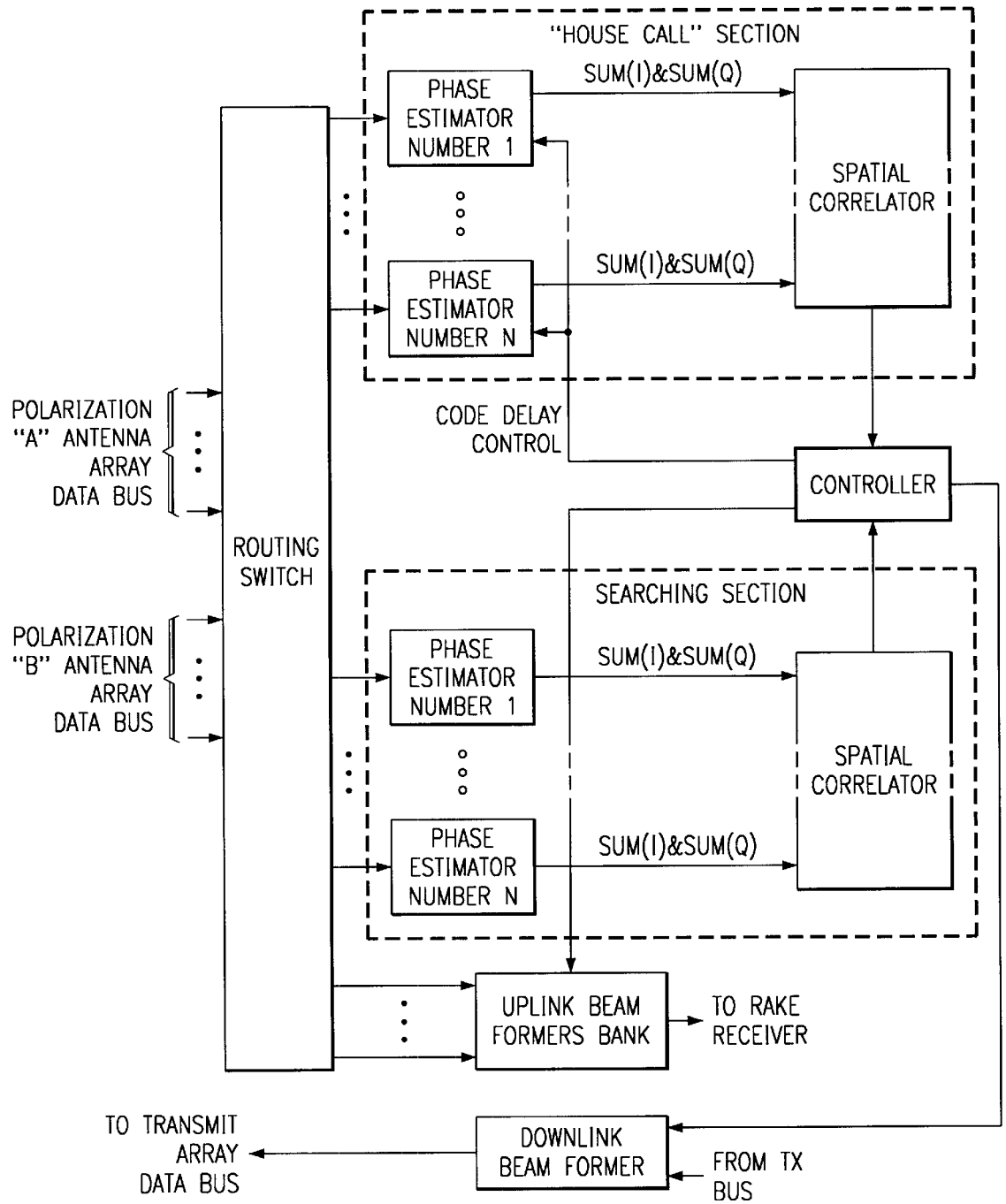

FIG. 20 illustrates the structure of a dual polarization beam director according to an embodiment of the present invention.

Figure 21:
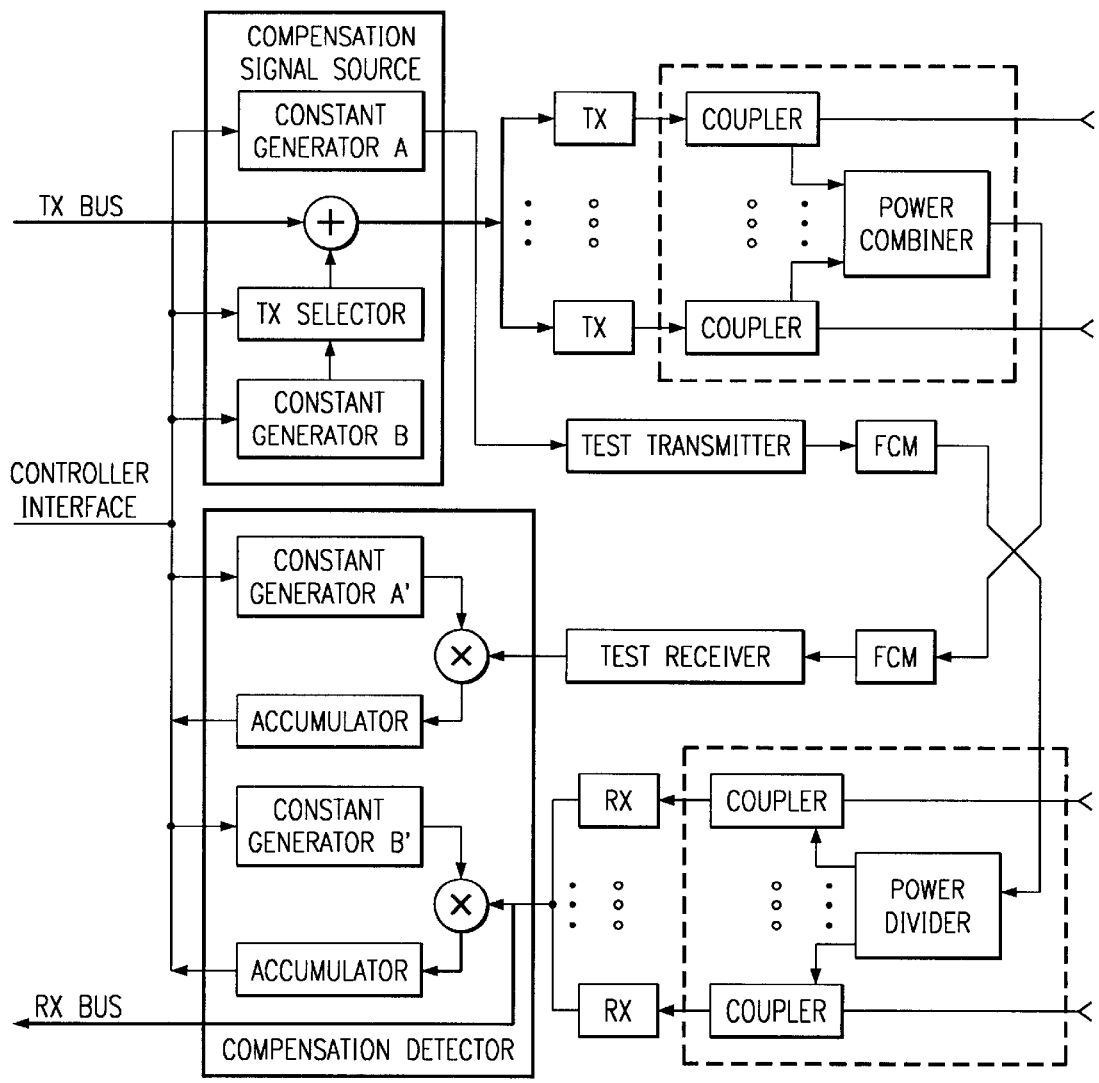

FIG. 21 shows compensation circuits which may be used to eliminate phase and amplitude imbalance within multi-channel CDMA receiving and transmitting systems, according to an embodiment of the present invention.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
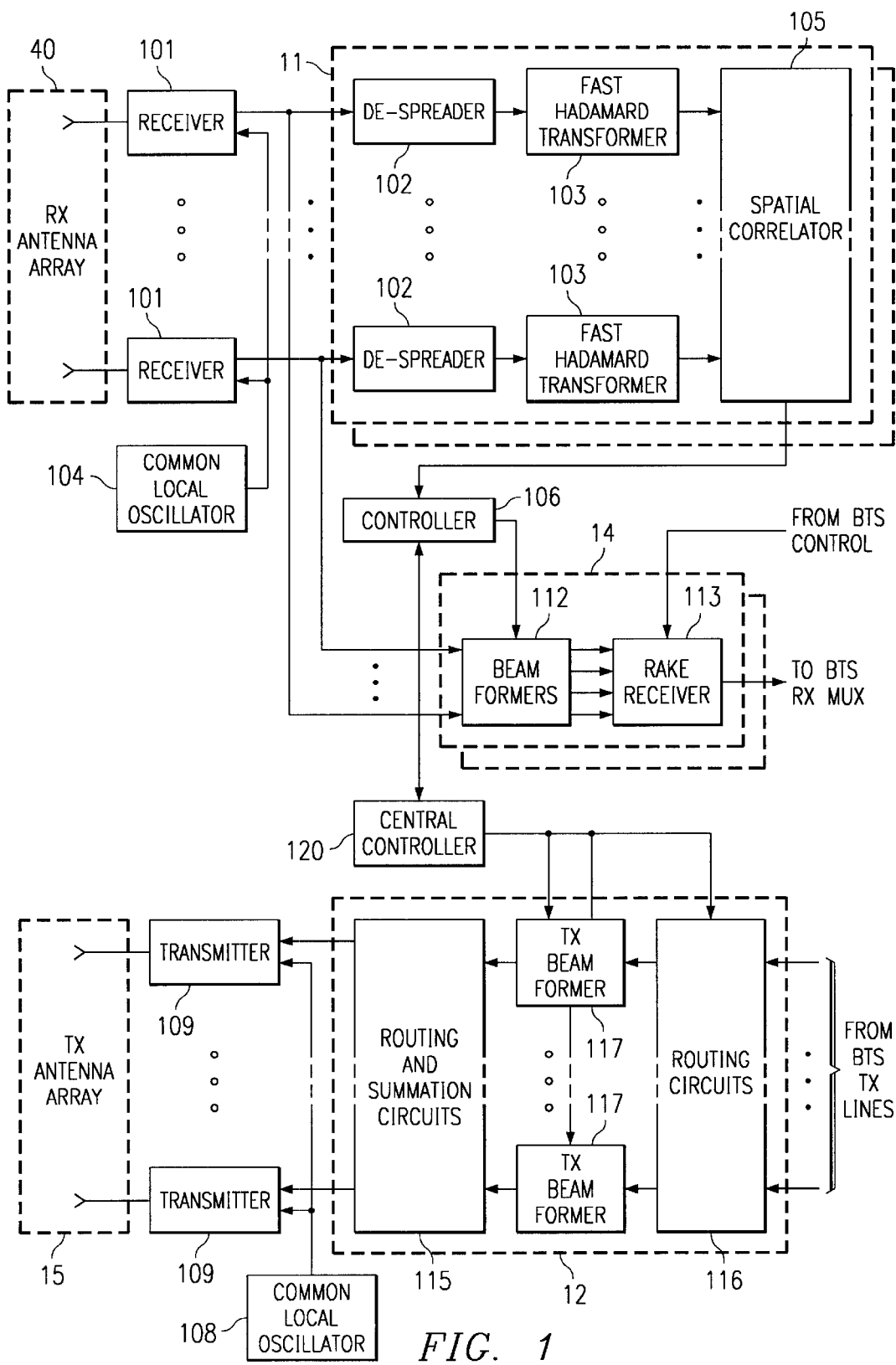

FIG. 1 provides a general view of the system architecture of a base station according to the present invention. The base station comprises a receiving antenna array 10 having N antenna elements. Preferably, the number N of antenna elements is approximately 16. In this embodiment, the system also comprises a separate antenna array 15 for transmission. Using antenna duplexers, however, the arrays can be combined, as is well known in the art. The embodiment allows for low cost duplexers and antenna filters since beam forming requires much less power per element to provide the required effective radiated power (ERP).

Each of the N antenna elements is coupled to a corresponding one of a set of N conventional receivers 101. Each receiver down-converts an incoming signal in frequency and digitizes it to produce a received signal having I & Q (in phase and quadrature) signal components. In this embodiment, the receivers are coherently tuned by a common local oscillator 104 to allow for both phase and amplitude data measurement, thereby producing, at any given instant, an N-dimensional received signal vector having complex valued components. Alternatively, a calibration signal of fixed frequency can be injected to all receiver channels simultaneously with the received signal, allowing for continuous estimation of the phase and amplitude difference among the receivers. The calibration signal can be differentiated from the received signal since it is not spread and can have a very low level since its integration can be very long. Specific relevant receiver designs are presented in U.S. Pat. No. 5,309,474.

The received signal vector from the N receivers 101 is fed to a set of L channel estimators 11 and also to a corresponding set of L receiver banks 14. Each channel estimator 11 and corresponding receiver bank 14 is used to estimate the channel and receive the signal from a single mobile unit. Thus the maximum number of mobiles that can simultaneously be served by the base station is L. In a preferred embodiment, L is at least 100. The estimators 11 are identical to each other in both structure and principles of operation. Similarly, the receiving banks 14 are also identical. Accordingly, the following description is limited to a single estimator 11 and its corresponding receiver bank 14 which serve to estimate the channel of a single mobile unit and receive its signal.

In the preferred embodiment, channel estimator 11 comprises a set of N despreaders 102, a corresponding set of N fast Hadamard transformers (FHTs) and a spatial correlator 105. The despreaders 102 are conventional code-correlators described in detail, for example, in U.S. Pat. No. 5,309,474. Each of the N despreaders correlates a single component of the received signal vector with a pseudo-noise (PN) code sequence assigned to the associated mobile in accordance with the IS-95 CDMA standard. Each code correlator uses a variable time offset (synchronized with the other code correlators in the same bank) to separate multipath parts that arrive with at least one PN chip period difference. The following description discusses the processing of one multipath part. All multipath parts that are strong enough to be isolated are processed identically.

Each correlator 102 outputs a despread signal corresponding to one multipath part of the signal from one mobile received at one antenna. This despread signal is fed into a fast Hadamard transformer (FHT) 103. Each FHT used in the present invention is identical to conventional FHTs (described, for example, in U.S. Pat. No. 5,309,474), except that the FHT of the present invention retains the complex phase information of the input. In other words, whereas the standard FHT outputs are converted to magnitudes, the FHT used in the present invention outputs complex numbers, thereby preserving both phase and amplitude data. Each FHT in this embodiment has 64 complex-valued outputs, whose magnitudes represent the degree to which the despread signal correlates to each of the 64 symbols in a predetermined symbol alphabet. In the preferred embodiment, the symbol alphabet is a set of 64 orthogonal Walsh symbols.

For a given symbol received at the array 10 (in IS-95, a symbol period is approximately 205 microseconds), the signals received at the N antenna elements are, separately and in parallel, passed through N respective receivers 101, despreaders 102, and transformers 103, while retaining the relative phase information of the signals. The collection of N FHTs together produce an N×64 signal matrix B of complex elements. Each column of B is an N-dimensional vector, called the spatial response vector, whose N components represent the correlation of one Walsh symbol with the signal received at the N antenna elements. The matrix B is fed column-by-column to the spatial correlator 105 following timing synchronized to the Walsh symbols.

As will be described in detail below in reference to FIG. 2, spatial correlator 105 correlates the signal matrix B with an array calibration matrix A to produce a correlation matrix C that represents the correlations of the signal received at the antenna array with both a set of predetermined directions and a set of predetermined symbols. From an analysis of the matrix C the correlator produces a signal angle of arrival (AOA), and a scalar value (AOA quality) that is proportional to the "purity" of the wave front and the signal level. This data is transferred to a controller 106 that uses it to determine the best uplink beam coefficients for this particular signal part. Typically, this entire process is performed for the four strongest multipath parts. In addition, time of arrival (TOA) and AOA certainty data are produced, allowing for the generation of a spatially matched filter that contains beamforming information for each signal part. The functions of the channel estimator 11 described above are performed in parallel in all the other channel estimators for the other mobiles being handled by the base station.

The controller 106 receives beamforming information from each of the channel estimators 11. Thus controller 106 obtains spatial information regarding all the signal parts from all the mobiles. The controller 106 then downloads this information, in the form of coefficients, to the receiving banks 14 which use the spatial information from the channel estimators 11 to improve the reception of the signals from the mobiles. Each receiving bank 14 comprises beam formers 112 to form narrow beams towards the signal parts associated with a single mobile. Because the strong signal parts are selectively detected, the beam former creates a well matched spatial filter for the incoming signal, including its multipath components. The beamformers 112 feed spatially filtered signals to the four fingers of a conventional IS-95 RAKE receiver 113 (described in U.S. Pat. No. 5,309,474). It should be noted, however, that the beam former outputs can be fed to other receiver types. As a result of the spatial filtering process described above, the carrier-to-interference (C/I) ratio is significantly improved over conventional CDMA systems. The improvement in C/I is about the ratio between the effective beamwidth created (about 10 to 30 degrees) to the existing antenna beams (about 100 to 120 degrees). Note that the AOA and TOA data are also transferred to the central controller 120 where the system determines the most optimal downlink beams configuration. The downlink process will be discussed later, as part of the explanation of FIG. 4.

Although the preferred embodiment uses an IS-95 based architecture, the above process can be implemented with any wireless protocol that makes use of a finite alphabet or training sequence. For example, in GSM systems a training sequence is available in every wireless burst. Since the training sequence is known, a correlation between the incoming signal and a stored training sequence at the receiver will produce same results as described above (provided frequency error is not too great relative to the sequence length). The correlator 102 and the Hadamard transformer 103 are replaced in this case by a training sequence correlator (convolver). Since there is only one possibility for a training sequence, it is not required to try for many possibilities as done by the Hadamard transformer in the preferred embodiment.

Figure 2:
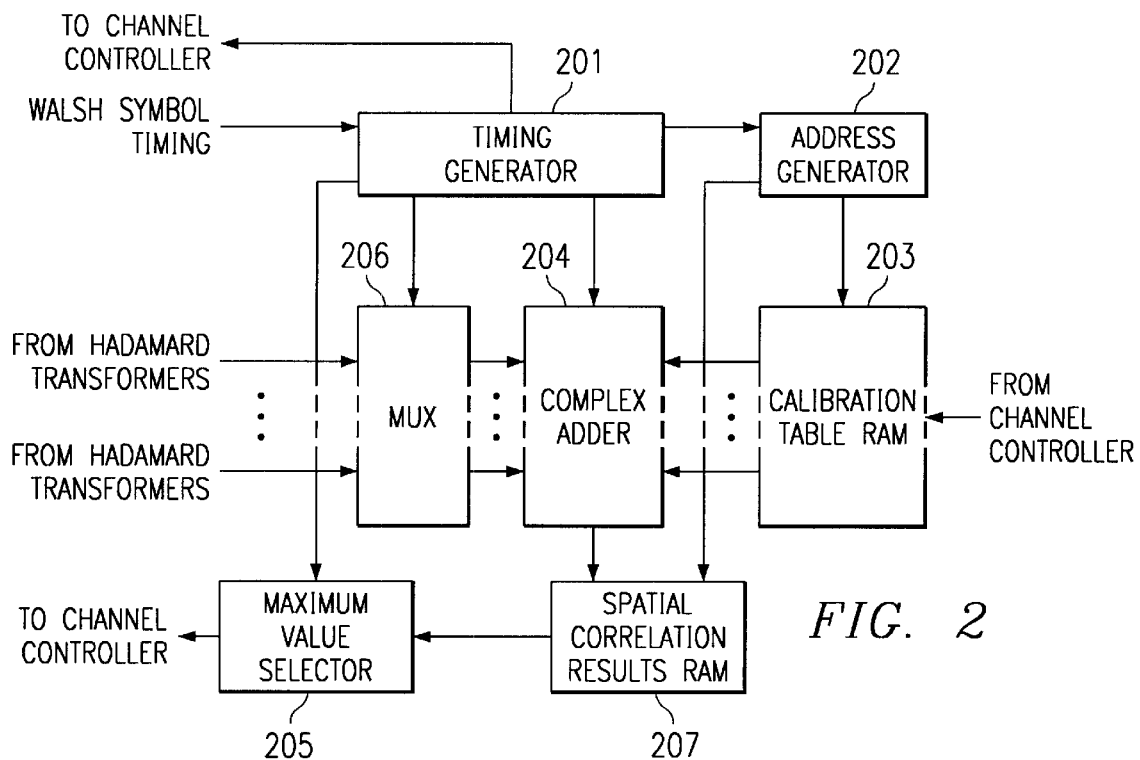

FIG. 2 illustrates the details of the spatial correlator 105. In this embodiment the spatial correlator is a stand-alone unit. Due to redundant functionality between this unit and the current implementation of the IS-95 RAKE receiver, however, the spatial correlator can be integrated with the RAKE receiver. Althought the preferred embodiment is optimized to IS-95 (uplink utilizing M-ary modulation), any signal that has either a finite alphabet (limited number of symbols) or a training sequence can utilize the same idea. The use of the known signal structure facilitates simple array response vector determination and eliminates the necessity for complex covariance matrix calculation and analysis. Hence, this approach can be utilized for GSM and TDMA wireless air-interfaces as well.

The columns of the signal matrix B (i.e. the spatial response vectors from the FHTs) pass through a MUX 206 and are then correlated with the columns of the array calibration matrix A which is stored in a RAM 203. In abstract terms, the correlation process is performed by multiplying the conjugate-transpose of the calibration matrix A by the signal matrix B. The result is a correlation matrix $C=A^H B$. It is important to note that this abstract calculation may be implemented in many different ways, all of which are mathematically equivalent to each other. The calibration matrix A is also known as the array manifold and is generated by measuring the antenna array response in antenna test range. Each column of A represents the response of the antenna array in one of a predetermined set of directions. For example, if the angular space is divided into 360 directions, then each of the 360 columns of A is an N-dimensional vector representing the response of the N antenna array elements in a given direction from the array. In the computation of the matrix C, these 360 vectors are spatially correlated with the 64 columns of the signal matrix B to produce a 360×64 element matrix, where element i,j represents the correlation of the received signal with the $j^{th}$ symbol in the $i^{th}$ angular direction.

In the preferred embodiment, the correlation is performed very efficiently through the use of a unique and simple calibration table representation which allows the matrix multiplication to be implemented without any multiplications. Each complex-valued entry of the calibration table matrix A is quantized such that both real and imaginary parts are each represented by two bits only. More specifically, each part is represented by one numerical bit plus one sign bit, thus: (0,0)=–0, (0,1)=+0, (1,0)=–1, (1,1)=+1. Each complex valued entry is therefore represented by just four bits. The reduced resolution in this simple quantization scheme is compensated by increasing the number of array elements to about twice relative to current base station arrays. This simple bit-plus-sign data structure allows the vector dot products between the matrix columns to be calculated using a complex adder 204. In conventional implementations, the vector dot product would require a collection of N multipliers that would dramatically increase the computational complexity of the system. The technique of the present invention, therefore, dramatically simplifies the implementation of the spatial correlation operation.

A timing generator 201 synchronizes the spatial correlator process to the Walsh symbol period (i.e. the end of the Hadamard transform) that is derived from the base station pilot timing. The N×64 signal matrix is latched into the MUX circuit 206 which provides the column vectors to the complex adder 204 one at a time. For each vector, the complex adder 204 performs separate correlations of the vector to every one of the 360 columns of the calibration matrix. Because the calibration table data are represented by only 0, 1, or –1, they are used in the complex adder to decide whether to null, add, or subtract each element in the vector. A RAM address generator 202 is driven also by same timing generator 201 to synchronize the presentation of 360 columns of calibration data with each latched vector.

Note that the number of array elements N does not change the correlation matrix dimensions, which are determined only by the number of predetermined symbols in the alphabet and the number of predefined angular directions. The correlation matrix C is stored in a spatial correlation RAM 207 and processed by a maximum value selector 205 that is a simple serial comparitor in the preferred embodiment. The end result of the spatial correlator process is the best expected AOA for the selected signal part and the associated "inner product" value (used as a certainty factor). This result is reported to the controller 106 only if a preset threshold has been crossed. This threshold value is updated from time to time as necessary. When the threshold has been crossed, the controller registers the time offset associated as the signal part TOA. This information is used to estimate the mobile unit range from the base station. It is possible to identify more than one maximum at a time utilizing a recursive process: after identifying the largest value in the correlation matrix, the neighboring matrix elements are ignored (ignoring the neighboring elements minimizes the probability for "non peak" selection) and another "peak" search is executed. This feature allows the identification of multipath parts that cannot be differentiated in time alone (as done in existing RAKE receivers), allowing for beam forming reception of small time spread multipath. This approach has great advantage for close to BTS mobile unit communication.

The threshold value is calculated by averaging the reported results over long averaging period "window". For example, K reported results are accumulated at the controller and the accumulated result is divided by K. Since most of the reported results are generated by non-time correlated elements, the results are "noise like" and averaging them provides a good estimate of the channel noise level. Since the channel noise is a linear function of the number of active mobile units, this level needs to be updated from time to time as stated.

Figure 3:
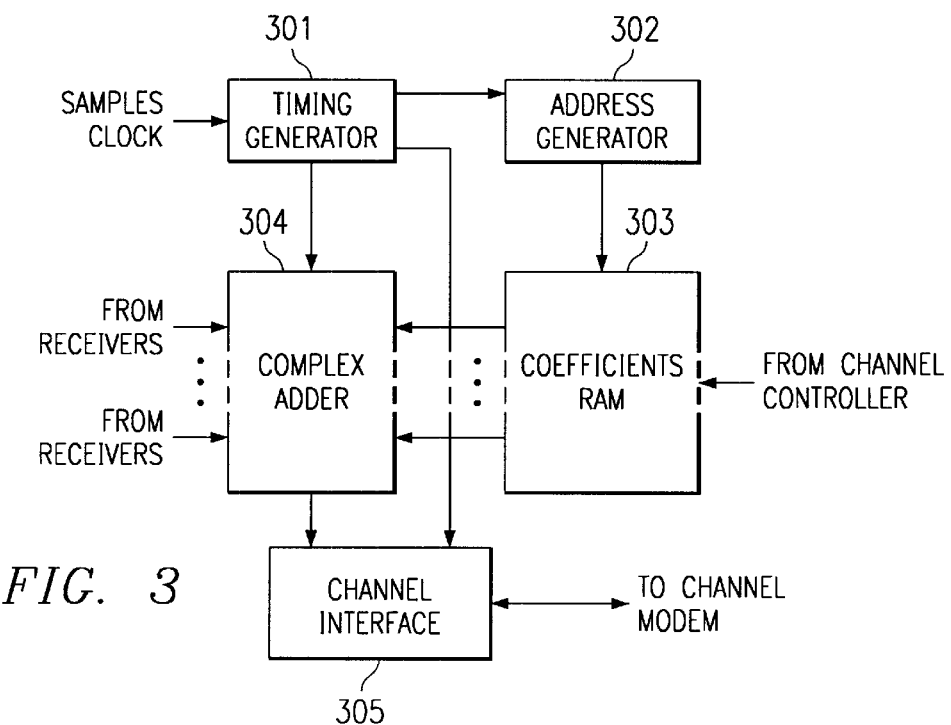

FIG. 3 details the uplink beam former 112 of FIG. 1. In this embodiment, the uplink beamformer is presented as a stand alone unit. However, it is possible to integrate the beam former into the channel estimator due to the "bit plus sign" arithmetic that makes it a very low gate count device. Signal outputs from the N base station receivers 101 are fed into a complex adder 304 for beamforming. Since the data rate for IS-95 is about 10 Mega-samples per second, the complex adder 304 can execute at least 4 vector sums per one vector data sample using present technology. The beamforming coefficients are downloaded from the controller as described above into a coefficient RAM 303. A timing generator 301 and an address generator 302 cause the coefficients to "rotate" into the complex adder. The coefficients are used as described above in reference to the spatial correlator of FIG. 2 to form a dot product using only complex addition. The vector summation result is fed into an interface unit 305 for transferring the result to the RAKE receiver modem. In other embodiments, any finite alphabet or training based protocol based modem could be used. The effect of the beamformer is to spatially filter the incoming signal to preferentially select for signals arriving from the known directions of the signal parts of a particular mobile unit. Signals from other directions are attenuated, and the reception of the desired signal is naturally improved.

Figure 4:
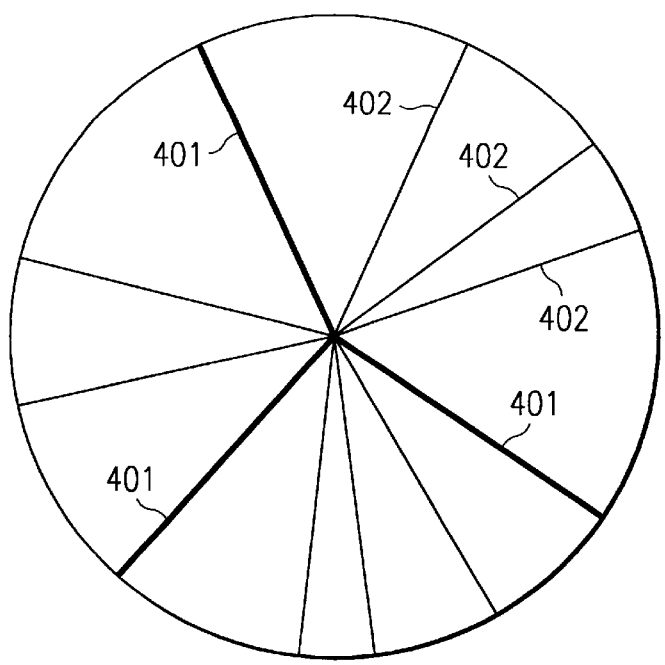
FIG. 4 illustrates an example of a spatial distribution of downlink beams.

FIG. 4 illustrates an example of a spatial distribution of downlink beams. Downlink management is quite different from the uplink since IS-95 is not a symmetrical protocol and uplink frequency is different from the downlink frequency by at least 60 MHz (cellular). The difference in frequency causes the uplink and downlink channels to be non-correlated. The AOA & TOA of the uplink and downlink, although statistically similar, may differ significantly. Hence, the downlink can be only statistically estimated based on data collected in the uplink, as described above. In addition, the downlink requires broadcasting of a pilot signal to associated mobile units. As a result, individual downlink beams are not possible; only "mobile group" beams are realizable. Hence, the downlink approach is based on a combination of wide and narrow beams determined by data collected in the uplink. The beam configuration is determined by the mobile unit distribution around the base station. The wide beams are required to assure proper coverage at close proximity to the base station where most of the downlink signal arrives to the mobile unit by way of scattering from nearby reflectors. The system adjusts the wide beams 401 to assure proper coverage for the mobile units close to the base station. The narrow beams 402 are adjusted mainly to accommodate "far away" mobile units. Since most of the mobile units will be in the outer coverage area, the narrow beams are expected to service the majority of the mobile units. Increasing the number of downlink beams causes the increase of softer handoff, thereby countering the increase in capacity. Hence, assigning beams in the downlink must be done very carefully.

The increase in downlink capacity can be estimated as follows:

$$Q*P + Q*P/N + X*P + X*P/N +$$
$$(Q(1-P)/N + X(1-P)/N)*(1+B) = Q$$
$$\Psi = \frac{Q+X}{Q} = \frac{1}{P + P/N + (1-P)(1+B)/N}$$

We assume a uniform mobile unit distribution, and a maximum illumination of Q, that is the maximum number of simultaneous transmission channels including softer handoff.

The term Q*P is the number of mobile units that come in with high angular spread, called "Wide Angles". Q*P/N is the portion of the portion of Wide Angles that are within the narrow beam, and are all in softer handoff, thus, adding to the illumination in the overlapped sector twice.

If, as a result of the beam combination, X mobile units can be added, then X*P additional Wide Angle type are added (assuming P remains as before), out of which a portion X*P/N are following the same rule as for the Q*P/N above.

In the narrow beam space, we get Q(1-P)/N+X(1-P)/N mobile units, but due to some handoff caused by the overlap we must increase the value of their illumination by factor 1+B. B can be kept small since outer cells associated mobile units will naturally prefer the narrow beams.

Figure 5:
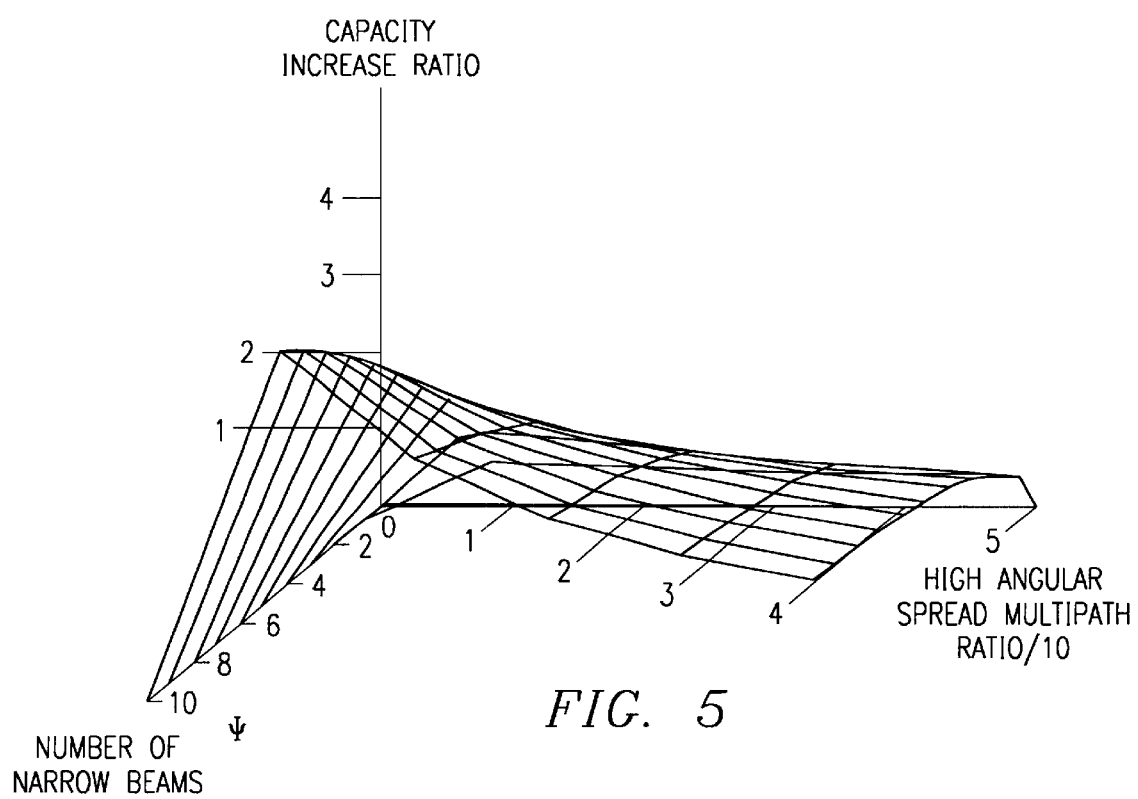
FIG. 5 is a graph of the capacity increase ratio with respect to both the number of narrow beams and the probability of wide angular spread multipath.
Figure 6:
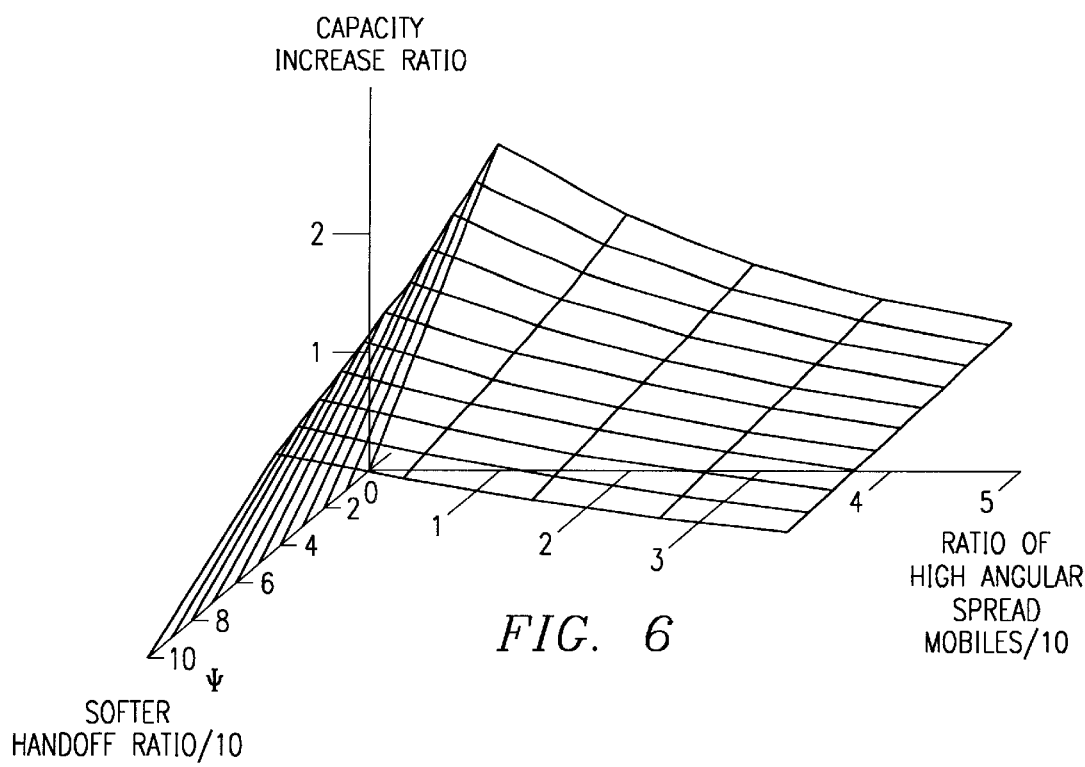
FIG. 6 is a graph of the capacity increase ratio as a function of handoff probability and the wide angular spread multipath probability for 4 narrow beams.
Figure 7:
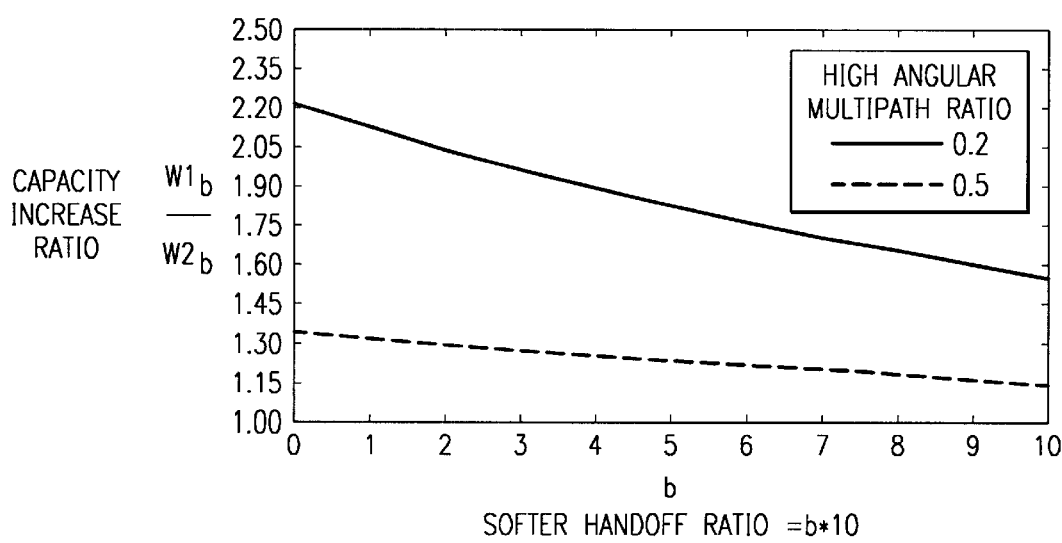
FIG. 7 is a graph of two cases of wide angular spread multipath for variable handoff ratio and 4 narrow beams.

FIG. 5 is a graph of the capacity increase ratio with respect to both the number of narrow beams and the probability/10 of wide angular spread multipath with softer handoff probability fixed at 20%. FIG. 6 is a graph of the capacity increase ratio as a function of handoff probability/10 and the wide angular spread multipath probability/10 for 4 narrow beams. FIG. 7 is a graph of two cases of wide angular spread multipath for variable handoff ratio and 4 narrow beams.

Figure 8:
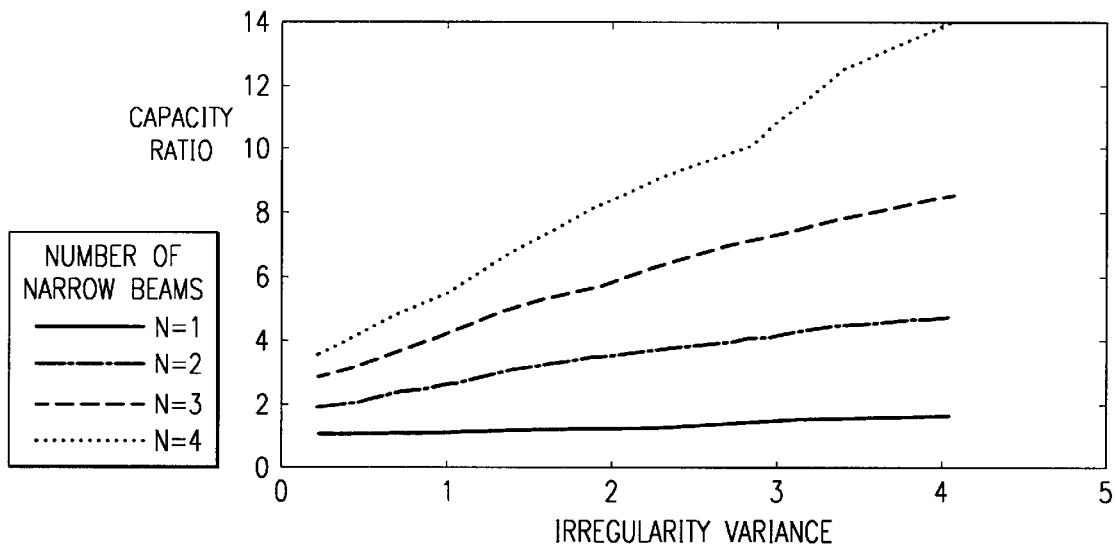
FIG. 8 is a graph of the expected capacity ratio for different density variance of mobile units.

Following the above analysis, the enhancement of capacity for 4 narrow beams within one wide beam is approximately two. If the mobile unit distribution is non-uniform, the enhancement can be even higher. FIG. 8 is a graph of the expected capacity ratio for different density variance of mobile units. This improvement requires the narrow beam borders to be adjusted to avoid mobile unit density peaks. This adjustment function must be gradual to avoid excessive handoff while changing the beams.

FIG. 9 presents a flowchart of the downlink beamforming determination process. Mobile unit spatial data is collected and stored in memory. This data is then used to evaluate the mobile unit distribution around the base station by sorting the data into a two dimensional histogram. The histogram "peaks" are identified as follows: a two dimensional "smoothing" filter is executed to eliminate noisy histogram "spikes" and a common two dimensional "peaks search" process is utilized. For a system that is capable of forming M downlink beams, M "peaks" are sorted. The following is a closed loop process that adjusts the boundaries of the downlink beams and equalizes the number of mobile units associated with them. Narrowing the beams will cause some mobile units to handoff to different pilots leaving only mobile units close to the selected "peak" hanging on to the associated pilot. This process proceeds at a very slow pace to avoid excessive handoff.

FIG. 10 presents an apparatus to generate an antenna array manifold (calibration table). An antenna array 601, incorporates a collection of antenna elements, installed on a support mast that is connected to a turn-table 504. The controller 506 commands the turn-table to rotate in predetermined angle steps. A network analyzer 505 transmits through a transmitting antenna 502 an RF signal which is received by the antenna array 601. The signals received at the elements in the antenna array are routed through an RF switch 503 to the network analyzer for measurement. In the preferred embodiment, the antenna array is circular but the invention can be implemented with an arbitrary array shape. The RF signal collected for each antenna element in this case can be written as follows:

$$V_{k,\theta} = F_{k,\theta} \cdot e^{j\frac{2\pi(R\cos(2\pi k/M - \theta)}{\lambda}}$$

V represents the array manifold function, k is the element number and θ is the relative angle of arrival (created by rotating the array relative to the RF signal source). M is the total number of antenna elements in the circular array. λ is the RF signal wavelength. The data is collected and stored in a data storage unit and controller 506.

FIG. 11 presents an embodiment illustrating a training sequence convolver, which may be used instead of the despreader 102 and FHT 103 in some wireless standards. A data register 702 is a first-in-first-out (FIFO) unit with a word bandwidth that is matched to the receiver I & Q output width. The I & Q samples are shifted through the data register 702 in two's complement format. XOR gates are used to compare the most significant bit of I and the most significant bit of Q with bits of a training sequence stored in a training sequence register 703. The resultant XOR outputs are fed to an adder 701 and used to determine whether to add or subtract each I & Q sample in the data register. The output of the adder is updated for every sample cycle and compared against a threshold in a magnitude threshold detector 704. When the threshold is exceeded, the I & Q values are registered as a component of the signal response vector that is then sent to the spatial correlator explained above.

FIG. 12 presents an embodiment of the invention that includes both searching and tracking functions (in angle and time). The addition of angular tracking increases the ability of the system to efficiently direct the receiving beams at all times. A searcher 80 acquires new multipath parts as before while a tracker 83 tracks them. The principle of operation of this embodiment is very similar to the embodiment described in FIG. 1. The main difference relative to FIG. 1 is the addition of the tracker 83. The N receiver outputs are fed in parallel to beamformer 812. The controller 81 downloads to the beam former 812 not just one, but two beamforming information sets for each signal part to be tracked. The two sets correspond to two adjacent columns in the calibration matrix. This allows the beam former to continuously "toggle" between two angularly adjacent beams.

The beam former output is fed into an "early/late gate" module 813 known in the art. The result of the combined "toggling" beam former and the "early/late gate" is in the form of four level values corresponding to: left beam/early time, right beam/early time, left beam/late time and left beam/late time. Since the tracker is designed to track four multipath parts simultaneously, the results are reported to the controller through a multiplexer 815.

The controller 81 directs the beamformer and the "early/late gate" to balance all the four values above the same level by exchanging the beam former coefficients and advancing/delaying the gate's clock. Angular tracking is achieved by equalizing the right and left associated results while the time tracking is achieved by equalizing the early late associated values. This embodiment assures sufficient integration for reliable tracking. The sets of coefficients are entirely replaced when the searcher finds a multipath part that generates a significant higher level output than the ones tracked. In this embodiment, each channel is assigned its own downlink beamformer 830. Note also that this embodiment supports an individual beam for each active channel.

FIG. 13 presents an overview of a base station that employs channel estimators/trackers/beamformers described in FIG. 12. The antenna array 90 is coupled to a set of receivers 901 which are all driven by common local oscillator 904, as in FIG. 1. The receiver output is placed on a data BUS 910 to feed a plurality of channel estimators/trackers/beamformers 905, each of which provides a BTS channel element 906 with a plurality of signal parts. Element 906 can be a RAKE receiver/data transmitter of IS-95. The channel elements are feeding downlink data to the channel estimator/tracker/beamformers, which feed beamformed data to summation unit 907. The summation unit outputs summed beam formed data to the BTS transmitters 909 that are driven by common local oscillator 908. The transmitter outputs are radiated through transmitting antenna array 91.

The above embodiment of the downlink requires additional "pilots" when applied to a CDMA IS-95 base station. This may require some changes in the network control and network pilots allocation design. The following embodiment alleviates this requirement by distributing the overhead channels (pilot, paging and synch.) through a wide beam while the traffic channels are individually transmitted through narrow beams directed at the associated mobile units. This approach does not change the conventional BTS softer handoff profile, hence it does not require any changes in the network architecture.

This arrangement is facilitated by careful array beam synthesis techniques that are well known in the art. In particular, the beams are constructed to be phase matched in the mobile unit's scattering region. The beams' coefficients are calculated to achieve identical wave-fronts between the pilot and the traffic signals, hence, allowing the current IS-95 coherent demodulation at the mobile unit. This "beam matching" is facilitated using beam synthesis based on a minimum root mean square approach. This approach allows for plus or minus 10 degree phase matching down to −10 dB points, which is sufficient not to degrade the performance of the coherent demodulator at the mobile unit.

The coefficients of the individual downlink beams are set as follows: the overhead data (pilot, synch and paging) are transmitted through fixed, relatively wide beams. The downlink traffic data beams are set to match the line of bearing as measured by the uplink channel estimator with sufficient width margin to compensate for bearing error (due to lack of correlation between up and down links). It should be noted that even relatively wide downlink traffic beams will provide a significant capacity increase.

Since the angular spread is getting larger as the distance to the base station decreases, the narrow beam width is estimated based on the estimated distance from the BTS. This distance is derived from the time delay as measured by a beam director.

Since the above approach is based on the statistical profile of the scattering region (various scattering models are considered), the system must provide for exceptions: at first, the allocated traffic narrow beam is made wider than needed, and as done with the forward power control, it is gradually narrowed based on the frame erasure rate (analogous to bit error rate) that is reported on the uplink. In case the frame erasure rate increases, the traffic beam is widened accordingly. This mechanism will also compensate for situations where the uplink angle of arrival (AOA) is very different from the downlink AOA.

Fading Mitigation Using Wide Aperture Antenna Array

The present section discloses a technique for mitigating fading effects. Fast fading is considered to be a major issue in wireless communication. Fast signal fading is created by the combination of multipath components of a signal being reflected from various elements ("scatterers") in the neighborhood ("scattering zone") of a moving transmitter with random phases. The destructive combining at the receiving antenna produces time varying signal levels with a power density function described by Rayleigh distribution. The "nulls" in the power/time function can cause significant errors in the transmitted information (characterized by "burst bit errors" in digital communication).

Conventional communication systems reduce the fading effects by interleaving the transmitted data and de-interleaving the received data, with the addition of proper error correction techniques. In addition, spatial diversity is a very common method for mitigating fading: a signal received at two sufficiently spaced antennas (10 wavelengths or more) can be shown to have small correlation in the power/time function. Hence, most point to multipoint communication systems utilize spatial diversity combining to reduce fading effects. In most cases, the receiver either selects the antenna with the stronger signal power ("selection diversity") or combines two or more antenna outputs after compensating for phase & amplitude differences among the antennas ("maximal ratio combining"). Spread spectrum direct sequence systems (such as IS-95) provide for additional fading mitigation by time diversity. If multipath components arrive with sufficient time spacing, their power/time functions are not correlated. In IS-95, the RAKE receiver provides for a plurality of demodulators ("fingers"), each assigned to a different time of signal arrival. Typically, the number of demodulating channels at the base station is four. If the arriving signal multipath has significant delay spread (several microseconds), the system can successfully assign different "fingers" to the incoming multipath components and provide for excellent fading mitigation. In most cases, however, the delay spread is not sufficient to provide for time diversity (especially in suburban areas), and the majority of fading mitigation is still provided by spatial diversity and coding. Since current base stations employ only two antennas per sector, only two "fingers" are usually active.

In contrast with the above techniques, the following description provides a method utilizing a plurality of antennas arranged in a wide aperture array and digital signal processing to estimate multipath angle and time of arrival, allowing the assignment of multi-antenna beams toward the incoming signal parts. This technique mitigates fading and eliminates the need for fast tracking of the changing AOA due to varying multipath.

The typical scattering zone around a mobile transmitter is described by a circle with a radius of about 30 to 100 wavelengths in size. If there are large reflectors in the neighborhood (such as very large buildings or mountains), they can create secondary scattering zones that produce time differentiable (by a spread spectrum receiver) multipath propagation, and hence, provide for multiple scattering zones. In traditional spatial diversity (see above), the signal is collected at different points in space where the arriving multipath is combined with different phases, hence, when in one antenna there is a destructive combining situation, the other antenna has high probability to be in constructive combining status. Using the wide aperture array described above in relation to the present invention, narrow beams (typically 3 to 10 degrees in width) can be constructed to cover different sections of the scattering zone. High sidelobes due to array dimensions are not considered a significant problem in the case of CDMA since the interference is the summation of all other active subscriber energies. Moreover, since the sidelobes are narrow by nature, they are mostly rejected.

If the beamwidth is narrow enough relative to the scattering zone size, different populations of multipath sources participate in each beam, and hence, the power/time function at each beam will not be correlated with the other beams. Since the typical RAKE receiver can accept four antenna beams, the invention provides for simultaneous non-correlated power/time function processing. Simulation results show that the effectiveness of this method is very similar to the current spatial diversity method. Since each beam is a result of several antenna outputs that provide gain that is roughly the number of combined elements (relative to a regular receiving base station's antenna), the result is both gain and fading mitigation.

The angle/time of arrival estimation described above allows for both single scattering zone and multi-scattering zone handling. Angular spread can be determined in real time by way of histogram processing of angle of arrival samples. When fading is produced by a large scattering zone, the angle of arrival results (AOA samples) are distributed with large variation (and can be estimated by the variance of AOA results). The main AOA however can be estimated by the histogram center of gravity. The histogram center of gravity is determined by "smoothing" the histogram through a low pass filter (e.g., Hamming or Raised Cosine) and finding the maximum point of the "smoothed" histogram.

For small angular spread conditions (2 to 3 degrees) associated with a small scattering zone or distant subscriber, two to four beams are contiguously arranged with some overlap to cover the scattering zone. This arrangement provides for the CDF curve described in FIG. 14. The presented CDF shows the behavior of symbol amplitude as received by the system using the multi-beam arrangement. As the angle spread increases, the beams are oriented accordingly. In this case beams are angularly spread to sample different sections of the scattering zone. In addition, the beam width can be increased (to limited degree, due to array structure). As FIG. 15 shows, the effectiveness of the fading mitigation increases when the angle spread increases (due to smaller distance to subscriber, mostly). The solid curve left represents the CDF for standard spatial diversity. The curves on the right are as follows: the dashed curve represents the CDF for a single beam directed at the center of the scattering zone. The "dashed dotted" curve represents a single beam that is quickly tracking the changing AOA associated with the varying multipath (this requires very high processing power and hence is not recommended here). The solid curve represents the multi-beam arrangement suggested in this disclosure.

Note that the correlation level R between two beams can be approximated by $$R = w_1^H \cdot w_2,$$

where $w_1$ and $w_2$ are the weight vectors of the two beams.

In summary, the above arrangement provides fading mitigation by multiple beams for a highly directional antenna array. Moderate beamwidth (10 degrees or more) will not provide diversity since the beams "encapsulate" the whole scattering zone and hence cannot provide for non-correlated multipath combining. The wide aperture array described previously sacrifices high array sidelobes for the sake of diversity (enabling partial scattering zone coverage). The proposed arrangement is the best optimization of gain and fading mitigation. Note that the proposed multi-beam arrangement eliminates the need for tracking.

Application to Wide-Band CDMA Systems

This section discloses techniques that allow the principles of the present invention to be applied to wide-band CDMA systems, as well as to other systems having a pilot signal with known structure in the uplink transmission. In other words, the techniques described above may be extended to accommodate any wireless communication system that includes a "known structure" signal as part of the signal transmission, and in particular a pilot signal that is superimposed onto traffic and signaling data within wide band CDMA (W-CDMA) communication systems. In addition, this section supplements the above mentioned techniques with the utilization of a dual polarized antenna array.

The techniques described below provide the ability to estimate an angle of arrival of a signal received at an antenna array using the following implementation:

I. Mobile station transmits a known structure signal (note that the known structure signal can be embedded within transmitted information signal).

II. The known structure signal comprises n-bits of data. Typically, a limited number m combinations of $2^n$ possible combinations form known information. E.g., for 64 Walsh symbols in an IS-95 traffic channel, n=64, m=64; for a pilot channel in W-CDMA, n=any number of bits, m=1.

III. Receiving station obtains I and Q components of this signal on each of N elements of antenna array.

IV. A known signal structure pattern correlator produces a m×N complex array response matrix by correlating each of N I and Q components of this signal on each of the elements of the antenna array with m patterns.

V. A spatial correlator multiplies the array response matrix by an N×A complex array calibration matrix and obtains a m×A complex spatial correlation matrix that is immediately reduced to an absolute value magnitude matrix. The number A represents the number of possible angles of arrival, corresponding to the array manifold. The N×A array calibration matrix can be of low bit count, eliminating the need for many multiplications.

VI. A spatial analyzer processes this m×A magnitude matrix to obtain an estimation of the angle of arrival by identifying the column that contains the maximum absolute valued element of the m×A magnitude matrix.

VII. The above process can be applied to any system that utilizes a "known structure signal" such as CDMA, TDMA and FDMA (with training sequence).

To apply angle estimation to practical wireless systems the following components can be added.

I. The above process is repeated for a range of time of arrival (TOA) values, as necessary.
II. The system evaluates the signal multipath angular and time distribution.
III. The system assigns optimized array coefficients to the receive array and transmit array.
IV. The process is repeated to follow the mobile station movements.

Pilot Assisted Beam Forming

The method described above is used in the following embodiment of spread spectrum communication systems capacity enhancement. To provide for capacity enhancement for CDMA communication systems the following elements are proposed:

1. Uplink Channel Estimation.
2. Beam Forming for the uplink to provide for enhanced antenna array gain, spatial directivity and fading mitigation (through diversity).
3. Beam Forming for the downlink for enhanced array gain and spatial directivity.

A basic difference of W-CDMA relative to IS-95 based CDMA is the existence of a pilot in the uplink. For example, FIG. 16 presents a possible implementation of a W-CDMA uplink traffic channel transmitter. The access channel is a subset of the traffic channel (no signaling channel). The pilot code period is 20 milliseconds and includes 81920 chips. The known signal structure is a subset of chips in the pilot sequence and only one combination m is used in transmission of the pilot signal. Consequently, the array response matrix has only one row and will be called the array response vector.

Obtaining the Array Response Vector

The presence of the pilot data in the uplink allows the system to obtain the array response vector. Although the following discussion focuses on W-CDMA systems, it is applicable to any system that embeds a known signal sequence together with its traffic or signaling data.

A regular W-CDMA receiver synchronizes its demodulator to the incoming W-CDMA signal by hypothesizing on periods of pilot data streams: each hypothesis consists of accumulating a number of incoming signal samples multiplied by internally generated replicas of pilot samples (i.e., inner product between the incoming signal and the generated signal). The pilot's replica sequence is delayed for each subsequent TOA hypothesis and the correlation process repeats. When the internal generated pilot's replica is synchronized with the incoming signal, the magnitude is maximized indicating "lock" conditions. Continuing the above accumulation process results in accurate pilot, and hence, carrier phase determination. Since the pilot part of the incoming signal exists all the time, the integration period is limited only by the mobile station movement (Doppler spread) and inaccuracy of carrier frequency used at the receiver demodulator. Since for a typical mobile the Doppler rate is less than 100 Hertz, and frequency error is usually on the order of hundred Hertz, the integration period could span over several milliseconds, which is far longer than the symbol duration. This method is similar to demodulation in the IS-95 downlink.

The pilot correlation process described above can be used to estimate the carrier relative electrical phase as illustrated in FIG. 17. The incoming signal is divided into two branches and multiplied by a quadrature local oscillator to produce I & Q signals. After base band filtering and digitizing, the I & Q sample streams are multiplied by the pilot code sequence delayed by a preset value of TOA (time-of-arrival). The multiplication products are summed at each branch and scaled to produce SUM(I) and SUM(Q). If the pilot code sequence time is different from the incoming sequence timing by more than one chip duration the SUM(I) & SUM(Q) values are small (following the auto-correlation function of the pilot sequence).

The technique utilizes an antenna array consisting of N antenna elements. An array of SUM(I) & SUM(Q) values of all antenna elements represents the array response vector. FIG. 17 shows a possible circuit to obtain a single element of the array response vector.

Spatial Correlation and Channel Impulse Response (CIR) Acquisition

The details of the spatial correlator and spatial analyzer implementation have been described previously. A spatial analyzer provides magnitude and angle of arrival (AOA) information for the highest power multipath part confirming a preset TOA. Arrays of magnitude and AOA values obtained for a set of TOA values represent a channel impulse response (CIR). An example of a CIR is shown in FIG. 19.

Use of Channel Impulse Response (CIR)

A conventional searcher (e.g, in a RAKE receiver) varies the internally generated pilot sequence delay while evaluating the sum of squared SUM(I) and SUM(Q) signals to measure the magnitude component of the CIR. FIG. 18 illustrates an enhancement to the normal search process utilizing a spatial correlator and analyzer in a manner similar to described in other embodiments of the present invention. The results of the spatial analyzer are read by the controller (both magnitude and AOA) to produce the CIR data. The controller analyzes CIR data to determine which TOA values are to be used by the "House Call" section. The "House Call" section is very similar to the searching section. However, the "House Call" section dwells on the TOA values that were determined from the CIR data as multipath TOA values. This mechanism allows for a high success-to-attempt ratio in measuring AOA data for the incoming multipath parts.

The angle/time of arrival estimation described previously allows for both single scattering zone and multi-scattering zone handling. Angular spread can be determined in real time by way of histogram processing of angle of arrival samples. When fading is produced by a large scattering zone, the angle of arrival results (AOA samples) are distributed with large variation (can be estimated by the variance of AOA results). The main AOA, however, can be estimated by the histogram center of gravity. The histogram center of gravity is determined by "smoothing" the histogram through a low pass filter (e.g., Hanning or Raised Cosine) and finding the maximum point of the "smoothed" histogram. The multipath scattering area size can be estimated by comparing the "smoothed" histogram "peak" value to the histogram data distribution. In case more than one scattering zone exists, thereby causing multiple "peaks" in the CIR data, a separate histogram process is performed for each significant "peak" associated with a TOA value in the CIR.

Uplink Beam Forming

The estimated AOA values along with scattering zone sizes (sectorial angles) are used to determine the coefficients of the uplink beam formers bank that feeds the uplink RAKE receiver. Since the number of RAKE receiver "fingers" is limited, the uplink beam assignment is optimized to maximize the RAKE combining efficiency. For example, if only a single scattering zone is identified, all beams are arranged to evenly cover the identified scattering zone. If multiple scattering zones are identified, beams are allocated to assure first that all distinct scattering zones are covered, and then the remaining available beams are added to provide diversity within the more dominant scattering zones.

Downlink Beam Forming

The present embodiment follows the same downlink principles discussed previously. The beam width is determined from the uplink multipath distribution. The beam's coefficients are set to assure illumination of the scattering zone as determined by the uplink multipath distribution.

Dual Polarized Antenna Array

Fading mitigation can be achieved as discussed above by spatial diversity, time diversity or any other arrangement that provides for non-correlated signal channels. Another known method to produce non-correlated signal channels is utilizing different polarization. The advantage of the different polarization approach is in the array size reduction: since the diversity is provided through polarization, the spatial dimensions are less important and the array can be made significantly smaller. The structure of a dual polarized (DP) beam director is illustrated in FIG. 20. The main difference relative to the beam director shown in FIG. 18 is the presence of a routing switch that allows the selection of signal data out of two antenna sets. One set is called "polarization A" and the other is called "polarization B". For example, polarization "A" could be +45° slant, and "B" could be −45° slant (0° vs. 90° polarization can be considered also, as well as various others). The routing switch allows the channel estimator to alternate between the two differently polarized antenna arrays and estimate the coefficients for both antenna arrays. The beam former bank can connect to either of the two arrays. For example, if one scattering zone is detected, two beams could be formed using the +45° antenna array and two beams could be formed using the −45° array. If two scattering zones are detected, each of the scattering zones can be covered with two differently polarized beams.

Since the diversity here is provided by polarization, the antenna array does not have to be large since very narrow beams are not required. The size of the array can be determined to provide sufficient beam shape with low sidelobes. Since this beam shape quality is also desired for the downlink (because it allows for good beam shaping flexibility), the same array could be used for both uplink and downlink. The downlink could use either one of the polarized arrays, or combined arrays (using hybrids to form circular polarized beams or linearly combined to form vertically polarized beams, etc.). This arrangement results in a much more compact antenna array.

Elimination of Phase and Amplitude Imbalances

This section describes techniques for eliminating phase and amplitude imbalances in the embodiments just described. Adaptive antenna arrays in transmit/receive base stations require simultaneous reception and transmission of signal replicas through multiple channels. This function requires known receiving and transmitting channel behavior, namely, known amplitude and phase response.

Analog parts of transmitting and receiving channels are subjected to non-predictable changes due to various causes: temperature change, aging of components, receive and transmit power fluctuation, etc. Hence, a method to measure the phase and amplitude response of the channels is required.

The phase and amplitude response of a signal channel can be measured using a "sounding" operation. This sounding operation involves the injection of an analog signal into the channel (with characteristics that are matched to the channel frequency and amplitude response) and the determination of the signal amplitude and phase at the channel output. In the case of an analog or TDMA base station, injection of a sounding signal may interfere with the on-going data transmission. If the sounding signal is made low, the sounding accuracy will degrade. CDMA communication allows for "embedding" the sounding signal within the general data flow without losing sounding accuracy or interfering with the main data signal. Since the data signal is code-spread (in IS-95 or a similar system), the sounding signal can be either non-modulated or code-spread. A "matched accumulator" (using a matched de-spreading code) on the channel output allows for coherent decoding of the sounding signal (to determine its phase and amplitude), while the data signal contribution to the detector output (being randomly distributed in phase and amplitude) is nullified. The measured phase and amplitude data can be used to correct the analog channel response, thereby eliminating phase and amplitude mismatch in a multi-channel receiving and transmitting system.

FIG. 21 shows compensation circuits used to implement the technique described above. The compensation subsystem evaluates both transmit (TX) and receive (RX) sections of the base station (BTS). The compensation signal source module provides sounding signals into the TX and RX channels as follows:

A constant generator A value is introduced into the test transmitter, providing a known amplitude and zero phase signal.

A constant generator B value provides a known amplitude and zero phase signal to the transmitter module (one at a time), selected for channel response evaluation.

Receiving Channels Compensation

The test transmitter output is frequency converted to match the RX modules using frequency converter module (FCM). The FCM injects the sounding signal to all RX channels through an equal phase and amplitude power divider. The RX output under evaluation (digital output) is selected and multiplied by the constant generator A'. Constant generator A' is made equal to constant generator A. Then, the digital values (I and Q) are accumulated by the compensation detector accumulator. The accumulation process period is limited only by the channel response variation rate (assumed to be very low) and the size of the accumulator's registers. Hence, the accumulation process provides for sufficient integration time needed for extraction of the sounding signal out of the signal mixture on the RX under evaluation (can be −30 dB relative to total signal energy in the channel). The function described above is repeated for each RX channel until all channels' amplitude and phase responses are known. The vector that contains all channels' compensation responses is called the "compensation vector". The compensation vector can be used, now, to correct the data amplitude and phase when measured or manipulated. For an angle of arrival determination, the system utilizes a generic calibration table that is determined while the antenna array is calibrated. This table is stored in the system's memory for the correlation calculation, as described earlier. The calibration table can be corrected by dividing each row by the corresponding compensation vector row (a complex value). This operation results in a corrected calibration table, eliminating all channel errors.

Transmitting Channel Compensation

The system selects a transmitting (TX) channel to be compensated by adding a constant (which can be very small) to the input of the TX unit under test. The constant is alternated between positive and negative values such that Generator B equals Generator B'. As for the RX channels, the same rules of randomized data signal vs. constant sounding signal apply. Hence, the channel sounding procedure is identical.

The TX outputs are combined (rather than selected) and converted to feed one test receiver. The combining, although it may degrade the SNR conditions, allows for a completely passive arrangement that is very important when the antenna array is located at the top of a tower (which is often not easily accessible). The rest of the circuit is very similar to the RX compensation circuit, including the correction of TX coefficients at the TX coefficients table.

As is evident from the various embodiments illustrated above, the present invention encompasses within its scope many variations. Those skilled in the art will appreciate that additional modifications may also be made to the above embodiments without departing from the scope of the invention. Accordingly, the true scope of the present invention should not be construed as limited by the details provided above for the purposes of illustration, but should be determined from the following claims and their legal equivalents.

What is claimed is:

1. A method for wireless communication comprising:
   a) transmitting from a mobile unit a code modulated signal obtained by modulating original symbols by a predetermined pseudo-noise sequence, wherein the original symbols represent an original information signal, and wherein the transmitted signal from the mobile unit includes a known-structure sequence;
   b) receiving at a base station antenna array N complex valued signal sequences received in parallel from N corresponding antenna elements;
   c) correlating in parallel each of the N signal sequences with the pseudo-noise sequence to select N received signals comprising N received symbols corresponding to a common one of the original symbols;
   d) transforming in parallel the N received symbols to obtain N complex-valued transformer outputs;
   e) correlating collectively the N transformer outputs with a set of complex array calibration vectors to obtain spatial information, wherein each array calibration vector represents a response of the antenna array to a calibration signal originating in a predetermined direction relative to the base station;
   f) repeating steps (b),(c),(d),(e) to obtain spatial information about multiple signal components;
   g) spatially filtering a subsequent set of N complex valued signal sequences in accordance with the spatial information about multiple signal components; and
   h) demodulating the spatially filtered subsequent set to obtain a symbol from the original information signal.

2. The method of claim 1 wherein the known-structure sequence comprises a pilot code sequence.

3. The method of claim 1 wherein the known-structure sequence composes a training sequence.

4. The method of claim 1 further comprising using the known-structure sequence to determine an array response vector for coherent demodulation.

5. The method of claim 1 further comprising determining a main angle-of-arrival of the transmitted signal by calculating a center of gravity of a histogram of angle-of-arrival signal samples.

6. The method of claim 1 further comprising identifying from a histogram of angel-of-arrival signal samples multiple scattering zones and an angle spread for each of the scattering zones.

7. The method of claim 1 further comprising measuring CIR and using the measured CIR to identify time-of-arrival information.

8. The method of claim 1 wherein spatially filtering comprises filtering through multiple narrow beams, whereby fading is mitigated.

9. The method of claim 8 wherein outputs from the multiple narrow beams are assigned to different fingers in a RAKE receiver.

10. The method of claim 1 wherein spatially filtering comprises filtering through beams with different polarization.

11. The method of claim 1 further comprising the step of tracking time and angle information of the multiple signal components.

12. The method of claim 1 wherein the original symbols are selected from a symbol alphabet comprising not more than 64 symbols.

13. The method of claim 1 wherein each of the N transformer outputs comprises a vector having M complex valued components representing correlations between a received symbol and M symbols of a symbol alphabet.

14. The method of claim 1 wherein the calibration vectors comprise complex valued components having 1-bit plus sign real part and 1-bit plus sign imaginary part, and wherein the correlating step comprises computing via addition only a vector dot product between the calibration vectors and the N transformer outputs.

15. The method of claim 1 wherein the correlating step yields spatial information about multiple signal components having a time spread less than one chip.

16. The method of claim 1 further comprising spatially filtering a downlink information signal in accordance with the spatial information about the multiple signal components, and transmitting the spatially filtered downlink information signal from the antenna array to the mobile unit.

17. The method of claim 16 wherein the spatially filtering comprises assigning the mobile unit to a calculated beam and generating the beam.

18. In a wireless communication system comprising a mobile unit and a base station having an N-element antenna array, a system for efficiently determining at the base station a spatial channel of the mobile unit, the system comprising:
   a) means for calculating a transform of a symbol as received from a first antenna of the antenna array, wherein the calculation produces a first M-dimensional vector having complex valued components, where M is a number of predetermined symbols in a symbol alphabet;
   b) means for performing said calculating simultaneously and in parallel for the symbol as received from N−1 additional antennas in the array, thereby producing a matrix B containing N row vectors of dimension M;
   c) means for calculating the matrix product $C=A^H B$, where each of L columns of the matrix A is an N-dimensional vector containing a response of the N antenna array in one of L predetermined directions relative to the array; and
   d) means for determining from the matrix C a spatial direction of a signal part originating from the mobile.

19. The system of claim 18 wherein M<65.

20. The system of claim 18 wherein the matrix A has complex valued elements having 1-bit-plus-sign real part and 1-bit-plus-sign imaginary part, whereby the matrix product calculation is efficiently performed.

21. The system of claim 18 further comprising means for determining from the matrix C an additional spatial direction of an small time separated signal part originating from the mobile.

22. A method for wireless communication comprising:
   transmitting an information signal from a mobile unit;
   receiving the transmitted signal with an array of N antenna elements to yield a set of N received signals;

spatially correlating the N received signals with the contents of an antenna array calibration table to obtain directional information about the mobile unit, wherein the stored calibration table comprises complex valued elements having 1-bit-plus-sign real part and 1-bit-plus-sign imaginary part, whereby spatial correlation is facilitated;

and spatially filtering subsequent received signals from the mobile unit in accordance with the directional information to obtain corresponding transmitted information signals, wherein spatially filtering comprises filtering through multiple narrow beams, whereby fading is mitigated.

23. The method of claim 22 wherein the receiving step comprises digitizing, despreading and Hadamard transforming, separately and in parallel, N air signals coupled to the N antennas.

24. The method of claim 22 wherein the correlating step comprises calculating vector dot products between the N received signals and columns of the array calibration table having complex-valued elements in the form of a bit-plus-sign real part and a bit-plus-sign imaginary part.

25. The method of claim 22 further comprising the step of assigning the mobile to a calculated downlink beam based on the directional information.

26. The method of claim 25 wherein the calculated beam is selected from among a dynamically adaptive set of overlapping downlink beams of differing angular extent.

27. The method of claim 25 wherein the assigning step is further based upon distance information such that close mobiles are assigned to broad beams and distant mobiles are assigned to narrow beams.

28. A method for wireless communication comprising:
transmitting uplink information signals from a set of mobiles;
receiving the uplink signals with an array of N antenna elements to yield a set of N received signals;
processing the N received signals to obtain spatial information about the mobiles, wherein the processing comprises identifying a known-structure sequence in the received signals;
calculating downlink beamforming information based upon the spatial information, wherein the beamforming information comprises assigning each of the mobiles to one of a set of downlink beams, wherein the set of downlink beams comprises wide beams for nearby mobiles and narrow beams for distant mobiles, and wherein the wide beams overlap the narrow beams; and
transmitting downlink information signals to the mobiles in accordance with the calculated downlink beamforming information.

29. The method of claim 28 further comprising tracking the spatial information about the mobiles in angle and time.

30. The method of claim 28 further comprising modifying the properties of the downlink beams based upon the spatial information in order to optimize system performance.

31. The method of claim 28 wherein the transmitting is performed in accordance with beamforming information comprising complex valued elements having 3-bit-plus-sign real part and 3-bit-plus-sign imaginary part.

32. The method of claim 28 wherein processing the N received signals to obtain spatial information comprises calculating a center of gravity of a histogram of angle-of-arrival signal samples.

33. The method of claim 28 wherein the known-structure sequence comprises a pilot code sequence.

34. The method of claim 28 wherein the known-structure sequence comprises a training sequence.

35. The method of claim 28 wherein the processing comprises Hadamard transfoming the N received signals and correlating the N transformed signals with an array calibration table.

36. The method of claim 35 wherein the array calibration table comprises complex valued elements having 1-bit-plus-sign real part and 1-bit-plus-sign imaginary part.

37. The method of claim 35 wherein the correlating comprises a matrix multiplication implemented as a complex addition.

38. A CDMA base station comprising:
an antenna array comprising N antenna elements;
a set of N receivers coupled to the N antenna elements to produce N incoming signals;
a set of N despreaders coupled to the N receivers, wherein the despreaders produce from the N incoming signals N despread signals corresponding to a single mobile unit;
a set of N symbol transformers coupled to the N despreaders, wherein the transformers produce complex-valued outputs from the despread signals;
a spatial correlator coupled to the N symbol transformers, wherein the correlator correlates the complex-valued outputs with stored array calibration data to produce beamforming information for multiple signal parts associated with the mobile unit;
a receiving beamformer coupled to the spatial correlator and to the N receivers, wherein the receiving beamformer spatially filters the N incoming signals in accordance with the beamforming information;
a RAKE receiver coupled to the receiving beamformer, wherein the RAKE receiver produces from the spatially filtered signals an information signal; compensation circuits for correcting phase and amplitude imbalances of transmit and receive channels.

39. The base station of claim 38 wherein the compensation circuits inject a low-level analog signal into a receive channel and coherently detect the analog signal at an output of the receive channel to determine the receive channel phase and amplitude.

40. The base station of claim 38 wherein the compensation circuits inject a low-level analog signal into a transmit channel and coherently detect the analog signal at an output of the transmit channel to determine the transmit channel phase and amplitude.

41. The base station of claim 38 further comprising a transmitting beamformer coupled to the spatial correlator, wherein the transmitting beamformer generates spatial beams in accordance with the beamforming information.

42. The base station of claim 41 wherein the spatial beams are selected from a set of calculated beams comprising narrow beams and overlapping broad beams, where the narrow beams are phase matched to the overlapping wide beams.

43. The base station of claim 38 further comprising a tracker coupled to the spatial correlator and to the receiving beamformer, wherein the tracker tracks the multiple signal parts and optimizes the performance of the receiving beamformer.

44. The base station of claim 38 wherein the array calibration data comprises complex valued array response elements represented as bit-plus-sign imaginary parts and bit-plus-sign real parts.

45. A method for wireless communication comprising:
a) transmitting from a mobile unit a code modulated signal obtained by modulating original symbols by a predetermined pseudo-noise sequence, wherein the original symbols represent an original information signal;

b) receiving at a base station antenna array N complex valued signal sequences received in parallel from N corresponding antenna elements;

c) correlating in parallel each of the N signal sequences with the pseudo-noise sequence to select N received signals comprising N received symbols corresponding to a common one of the original symbols;

d) transforming in parallel the N received symbols to obtain N complex-valued transformer outputs;

e) correlating collectively the N transformer outputs with a set of complex array calibration vectors to obtain spatial information, wherein each array calibration vector represents a response of the antenna array to a calibration signal originating in a predetermined direction relative to the base station;

f) repeating steps (b),(c),(d),(e) to obtain spatial information about multiple signal components;

g) spatially filtering a subsequent set of N complex valued signal sequences in accordance with the spatial information about multiple signal components;

h) demodulating the spatially filtered subsequent set to obtain a symbol from the original information signal; and i) determining a main angle-of-arrival of the transmitted signal by calculating a center of gravity of a histogram of angle-of-arrival signal samples.

46. A method for wireless communication comprising:

a) transmitting from a mobile unit a code modulated signal obtained by modulating original symbols by a predetermined pseudo-noise sequence, wherein the original symbols represent an original information signal;

b) receiving at a base station antenna array N complex valued signal sequences received in parallel from N corresponding antenna elements;

c) correlating in parallel each of the N signal sequences with the pseudo-noise sequence to select N received signals comprising N received symbols corresponding to a common one of the original symbols;

d) transforming in parallel the N received symbols to obtain N complex-valued transformer outputs;

e) correlating collectively the N transformer outputs with a set of complex array calibration vectors to obtain spatial information, wherein each array calibration vector represents a response of the antenna array to a calibration signal originating in a predetermined direction relative to the base station;

f) repeating steps (b),(c),(d),(e) to obtain spatial information about multiple signal components;

g) spatially filtering a subsequent set of N complex valued signal sequences in accordance with the spatial information about multiple signal components;

h) demodulating the spatially filtered subsequent set to obtain a symbol from the original information signal; and i) identifying from a histogram of angle-of-arrival signal samples multiple scattering zones and an angle spread for each of the scattering zones.

47. A method for wireless communication comprising:

a) transmitting from a mobile unit a code modulated signal obtained by modulating original symbols by a predetermined pseudo-noise sequence, wherein the original symbols represent an original information signal;

b) receiving at a base station antenna array N complex valued signal sequences received in parallel from N corresponding antenna elements;

c) correlating in parallel each of the N signal sequences with the pseudo-noise sequence to select N received signals comprising N received symbols corresponding to a common one of the original symbols;

d) transforming in parallel the N received symbols to obtain N complex-valued transformer outputs;

e) correlating collectively the N transformer outputs with a set of complex array calibration vectors to obtain spatial information, wherein each array calibration vector represents a response of the antenna array to a calibration signal originating in a predetermined direction relative to the base station;

f) repeating steps (b),(c),(d),(e) to obtain spatial information about multiple signal components;

g) spatially filtering a subsequent set of N complex valued signal sequences in accordance with the spatial information about multiple signal components;

h) demodulating the spatially filtered subsequent set to obtain a symbol from the original information signal; and i) measuring CIR and using the measured CIR to identify time-of-arrival information.

48. A method for wireless communication comprising:

a) transmitting from a mobile unit a code modulated signal obtained by modulating original symbols by a predetermined pseudo-noise sequence, wherein the original symbols represent an original information signal;

b) receiving at a base station antenna array N complex valued signal sequences received in parallel from N corresponding antenna elements;

c) correlating in parallel each of the N signal sequences with the pseudo-noise sequence to select N received signals comprising N received symbols corresponding to a common one of the original symbols;

d) transforming in parallel the N received symbols to obtain N complex-valued transformer outputs;

e) correlating collectively the N transformer outputs with a set of complex array calibration vectors to obtain spatial information, wherein each array calibration vector represents a response of the antenna array to a calibration signal originating in a predetermined direction relative to the base station;

f) repeating steps (b),(c),(d),(e) to obtain spatial information about multiple signal components;

g) spatially filtering a subsequent set of N complex valued signal sequences in accordance with the spatial information about multiple signal components, wherein spatially filtering comprises filtering through multiple narrow beams, whereby fading is mitigated; and h) demodulating the spatially filtered subsequent set to obtain a symbol from the original information signal.

49. The method of claim 48 wherein outputs from the multiple narrow beams are assigned to different fingers in a RAKE receiver.

50. A method for wireless communication comprising:

a) transmitting from a mobile unit a code modulated signal obtained by modulating original symbols by a predetermined pseudo-noise sequence, wherein the original symbols represent an original information signal;

b) receiving at a base station antenna array N complex valued signal sequences received in parallel from N corresponding antenna elements;

c) correlating in parallel each of the N signal sequences with the pseudo-noise sequence to select N received signals comprising N received symbols corresponding to a common one of the original symbols;

d) transforming in parallel the N received symbols to obtain N complex-valued transformer outputs;

e) correlating collectively the N transformer outputs with a set of complex array calibration vectors to obtain spatial information, wherein each array calibration vector represents a response of the antenna array to a calibration signal originating in a predetermined direction relative to the base station;

f) repeating steps (b),(c),(d),(e) to obtain spatial information about multiple signal components;

g) spatially filtering a subsequent set of N complex valued signal sequences in accordance with the spatial information about multiple signal components, wherein spatially filtering comprises filtering through beams with different polarization; and h) demodulating the spatially filtered subsequent set to obtain a symbol from the original information signal.

51. A method for wireless communication comprising:

transmitting uplink information signals from a set of mobiles;

receiving the uplink signals with an array of N antenna elements to yield a set of N received signals;

processing the N received signals to obtain spatial information about the mobiles, wherein processing the N received signals to obtain spatial information comprises calculating a center of gravity of a histogram of angle-of-arrival signal samples;

calculating downlink beamforming information based upon the spatial information, wherein the beamforming information comprises assigning each of the mobiles to one of a set of downlink beams, wherein the set of downlink beams comprises wide beams for nearby mobiles and narrow beams for distant mobiles, and wherein the wide beams overlap the narrow beams; and transmitting downlink information signals to the mobiles in accordance with the calculated downlink beamforming information.

* * * * *